United States Patent
Li et al.

(10) Patent No.: US 11,386,212 B2
(45) Date of Patent: Jul. 12, 2022

(54) SECURE MULTI-PARTY COMPUTATION WITH NO TRUSTED INITIALIZER

(71) Applicant: Advanced New Technologies Co., Ltd., Grand Cayman (KY)

(72) Inventors: Liang Li, Hangzhou (CN); Chaochao Chen, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/668,945

(22) Filed: Oct. 30, 2019

(65) Prior Publication Data

US 2020/0320605 A1 Oct. 8, 2020

Related U.S. Application Data

(63) Continuation of application No. PCT/CN2019/081385, filed on Apr. 4, 2019, which is
(Continued)

(51) Int. Cl.
*G06F 21/62* (2013.01)
*G06F 17/11* (2006.01)
(Continued)

(52) U.S. Cl.
CPC .............. *G06F 21/62* (2013.01); *G06F 17/11* (2013.01); *G06F 17/16* (2013.01);
(Continued)

(58) Field of Classification Search
None
See application file for complete search history.

(56) References Cited

U.S. PATENT DOCUMENTS 7,788,123 B1 * 8/2010 Ekhaus .............. G06Q 30/0282
705/26.7
8,620,919 B2 12/2013 Gates et al.
(Continued)

FOREIGN PATENT DOCUMENTS

| CN | 103713938 | 4/2014 |
|---|---|---|
| CN | 103995823 | 8/2014 |

(Continued)

OTHER PUBLICATIONS

Derbeko et al. "Security and privacy aspects in MapReduce on clouds: A survey", Computer Science Review 20 (2016). (Year: 2016).*

(Continued)

*Primary Examiner* — Neha Patel
*Assistant Examiner* — Clay C Lee
(74) *Attorney, Agent, or Firm* — Fish & Richardson P.C.

(57) ABSTRACT

Disclosed herein are methods, systems, and apparatus, including computer programs encoded on computer storage media for secure collaborative computation of a matrix product of a first matrix including private data of a first party and a second matrix including private data of the second party by secret sharing without a trusted initializer. One method includes obtaining a first matrix including private data of the first party; generating a first random matrix; identifying a first sub-matrix and a second sub-matrix of the first random matrix; computing first scrambled private data of the first party based on the first matrix, the first random matrix, the first sub-matrix, and the second sub-matrix; receiving second scrambled private data of the second party; computing a first addend of the matrix product; receiving a second addend of the matrix product; and computing the matrix product by summing the first addend and the second addend.

21 Claims, 8 Drawing Sheets

Related U.S. Application Data a continuation-in-part of application No. PCT/CN2018/110688, filed on Oct. 17, 2018.

(51) Int. Cl.
  *G06Q 30/02* (2012.01)
  *G06Q 30/06* (2012.01)
  *G06Q 50/00* (2012.01)
  *H04L 9/40* (2022.01)
  *G06F 17/16* (2006.01)

(52) U.S. Cl.
  CPC ..... *G06F 21/6263* (2013.01); *G06Q 30/0201* (2013.01); *G06Q 30/0282* (2013.01); *G06Q 30/0627* (2013.01); *G06Q 30/0631* (2013.01); *G06Q 50/01* (2013.01); *H04L 63/04* (2013.01); *H04L 2209/46* (2013.01); *H04L 2209/50* (2013.01)

(56) References Cited

U.S. PATENT DOCUMENTS

| | | | |
|---|---|---|---|
| 10,341,701 | B2 | 7/2019 | Hirsch et al. |
| 10,789,377 | B2 | 9/2020 | Chen et al. |
| 2009/0328226 | A1 | 12/2009 | Bradford |
| 2010/0046371 | A1* | 2/2010 | Sundararajan ........ H04L 1/1874 370/235 |
| 2011/0246500 | A1 | 10/2011 | Chandra et al. |
| 2012/0246736 | A1 | 9/2012 | Huang et al. |
| 2013/0031171 | A1 | 1/2013 | Serena |
| 2013/0054481 | A1 | 2/2013 | Upadhyaya |
| 2013/0097056 | A1 | 4/2013 | Sun et al. |
| 2014/0013353 | A1 | 1/2014 | Mathur |
| 2014/0040172 | A1* | 2/2014 | Ling ........ G06N 5/022 706/12 |
| 2014/0258027 | A1 | 9/2014 | Veugen |
| 2014/0258309 | A1 | 9/2014 | Young |
| 2014/0288999 | A1 | 9/2014 | Ovadia Amsalem et al. |
| 2015/0066689 | A1* | 3/2015 | Astore .......... G06Q 50/01 705/26.8 |
| 2015/0112812 | A1 | 4/2015 | Weinsberg et al. |
| 2015/0112838 | A1 | 4/2015 | Li et al. |
| 2016/0012088 | A1 | 1/2016 | Rossi et al. |
| 2016/0077878 | A1* | 3/2016 | Barber ........ G06F 9/44505 714/13 |
| 2016/0179950 | A1 | 6/2016 | Carmichael et al. |
| 2016/0286183 | A1* | 9/2016 | Haraguchi ...... H04N 9/3152 |
| 2017/0041606 | A1* | 2/2017 | Matsumura ...... H04N 19/117 |
| 2017/0171580 | A1 | 6/2017 | Hirsch et al. |
| 2017/0206470 | A1* | 7/2017 | Marculescu ...... H04L 67/22 |
| 2017/0228547 | A1 | 8/2017 | Smith et al. |
| 2018/0218426 | A1 | 8/2018 | Vaya et al. |
| 2018/0293283 | A1 | 10/2018 | Litoiu et al. |
| 2018/0373793 | A1* | 12/2018 | Eriksson ........ G06F 17/30843 |
| 2019/0004794 | A1* | 1/2019 | Raghavan .......... G06F 9/3012 |
| 2019/0013950 | A1 | 1/2019 | Becker et al. |
| 2020/0125745 | A1 | 4/2020 | Chen et al. |

FOREIGN PATENT DOCUMENTS

| | | |
|---|---|---|
| CN | 104156436 | 11/2014 |
| CN | 104966125 | 10/2015 |
| CN | 105550211 | 5/2016 |
| CN | 105677701 | 6/2016 |
| CN | 108228833 | 6/2018 |
| EP | 3179434 | 6/2017 |
| JP | 20128873 | 1/2012 |
| JP | 2013250981 | 12/2013 |
| KR | 20110020818 | 3/2011 |
| KR | 20120031478 | 4/2012 |
| KR | 20130136401 | 12/2013 |
| KR | 20180105744 | 9/2018 |
| RU | 2490713 | 8/2013 |
| RU | 2589320 | 7/2016 |
| RU | 2649797 | 4/2018 |
| RU | 2666336 | 9/2018 |
| WO | WO 2014023432 | 2/2014 |
| WO | WO-2014059921 A1 * | 4/2014 ....... H04L 25/03872 |
| WO | WO 2014138753 | 9/2014 |
| WO | WO 2015061696 | 4/2015 |
| WO | WO 2017184029 | 10/2017 |
| WO | WO 2017200510 | 11/2017 |

OTHER PUBLICATIONS

Baidu [online], "Secret sharing," Aug. 2018, [Retrieved on Dec. 24, 2019], retrieved from: URL<https://baike.baidu.com/item/%E7%A7%98%E5%AF%86%E5%85%B1%E4%BA%AB>, 8 pages (Machine Translation).

Crosby et al., "BlockChain Technology: Beyond Bitcoin," Sutardja Center for Entrepreneurship & Technology Technical Report, Oct. 16, 2015, 35 pages.

International Search Report and Written Opinion in International Application No. PCT/CN2019/081385, dated Jul. 23, 2019, 9 pages.

Nakamoto, "Bitcoin: A Peer-to-Peer Electronic Cash System," www.bitcoin.org, 2005, 9 pages.

Extended European Search Report in European Patent Application No. 19782894.0, dated Feb. 17, 2020, 7 pages.

Du et al., "Privacy-preserving cooperative scientific computations", Department of Computer Sciences and Center for Education and Research in Information Assurance and Security, Jun. 2001, pp. 273-282.

Kiltz et al. "Secure Computation of the Mean and Related Statistics", International Association for Cryptologic Research, Nov. 2004, pp. 1-20.

Amatriain, xamar.github.io [Online], "Big & Personal: data and models behind Netflix recommendations," 2013, [retrieved on Sep. 11, 2019], retrieved from: URL<https://xamat.github.io/pubs/BigAndPersonal.pdf>, 6 pages.

Baike.Baidu.com [online], "Secret Sharing," Encyclopedia entry, last edited Aug. 10, 2018, [retrieved on May 6, 2019], retrieved from: URL<https://baike.baidu.com/item/%E7%A7%98%E5%AF%86%E5%85%B1%E4%BA%AB>, 4 pages (machine translation).

Chaum et al., "Multiparty Computations Ensuring Privacy of Each Party's Input and Correctness of the Result," CRYPTO Advances in Cryptology, 1988, pp. 87-119.

Chen et al., "Latent Factor Models for Web Recommender Systems," Yahoo! Research Presentation: UT Austin Data Mining Seminar Series, Nov. 22, 2010, 40 pages.

D'Acquisto et al., arxiv.org [online], "Privacy by design in big date: An overview of privacy enhancing technologies in the ear of big data analytics," Dec. 2015, retrieved on Jan. 31, 2020, retrieved from URL<https://arxiv.org/abs/1512.06000>, 80 pages.

Dowsley et al., "A Two-Party Protocol with Trusted Initializer for Computing the Inner Product," Information Workshop on Information Security Applications , Apr. 2015, pp. 337-350.

Erkin et al., "Privacy-Preserving Emotion Detection for Crowd Management," International Conference on Active Media Technology, Aug. 2014, pp. 359-370.

Extended European Search Report in European Application No. 18865363.8, dated Nov. 6, 2019, 9 pages.

Extended European Search Report in European Application No. 18867292.7, dated Mar. 5, 2020, 11 pages.

Fang et al., dl.acm.org [online], "Secure Function Evaluation Using an FPGA Overlay Architecture," Feb. 2017, retrieved on Jan. 31, 2020, retrieved from URL<https://dl.acm.org/doi/10.1145/3020078.3021746>, 10 pages.

Feng et al., "Can user privacy and recommendation performance by preserved simultaneously?," Computer Communications, Jun. 2015, 68:17-24.

Henecka et al., dl.acm.org [online], "TASTY: Tool for Automating Secure Two-PartY computations," Oct. 2010, retrieved on Jan. 31, 2020, retrieved from URL<https://dl.acm.org/doi/10.1145/1866307.1866358>, 12 pages.

(56) References Cited

OTHER PUBLICATIONS

Kehler, dbis.rwth-aachen.de [online], "Privacy-Preserving Collaborative Filtering with SPDZ," Jun. 2018, retrieved on Jan. 31, 2020, retrieved from URL<http://dbis.rwth-aachen.de/cms/theses/hesis-PETs4DS-PPCF-SPDZ>, 109 pages.

Le, Medium.com [Online]. "The 4 recommendation Engines That Can Predict Your Movie Tastes," Apr. 2018, [retrieved on Sep. 11, 2019], retrieved from: URL<https://medium.com/@james_aka_yale/the-4-recommendation-engines-that-can-predict-your-movie-tastes-bbec857b8223>, 30 pages.

Li et al., "Enforcing Differential Privacy for Shared Collaborative Filtering," IEEE Access, Feb. 2017, 5:35-49.

Li et al., "FindU: Privacy-Preserving Personal Profile Matching in Mobile Social Networks," IEEE INFOCOM, Apr. 2011, pp. 2435-2443.

Liu et al., "Random projection-based multiplicative data perturbation for privacy preserving distributed data mining," IEEE transactions on knowledge and data engineering, Jan. 2006, pp. 92-106.

Nayak, cs.umd.edu [online], "Efficient Data—Oblivious Computation," 2018, retrieved on Jan. 31, 2020, retrieved from URL<https://www.cs.umd.edu/~jkatz/THESES/KartikNayak.pdf>, 248 pages.

PCT International Search Report and Written Opinion in International Application No. PCT/CN2018/110688, dated Jul. 19, 2019, 7 pages.

Shu et al., "CrossFire: Cross Media Joint Friend and Item Recommendations," Web Search and Data Mining, ACM, Feb. 2018, pp. 522-530.

Tang et al., iacr.org [online], "Privacy-preserving Context-aware Recommender Systems: Analysis and New Solutions," Apr. 2015, retrieved on Jan. 31, 2020, retrieved from URL<https://eprint.iacr.org/2015/364.pdf>, 18 pages.

Wang et al., "VirtualIdentity: Privacy-Preseving User Profiling," IEEE/ACM International Conference on Advances in Social Networks Analysis and Mining, Aug. 2016, pp. 1431-1437.

Yan et al., "A Unified Video Recommendation by Cross-Network User Modeling," ACM Transactions on Multimedia Computing Communications and Applications, Aug. 2016, 12(4):1-24.

Zhang et al., "Privacy-Perserving Social Media Data Outsourcing," IEEE INFOCOM 2018—IEEE Conference on Computer Communications, Apr. 2018, pp. 1106-1114.

U.S. Appl. No. 16/390,147, filed Apr. 22, 2019, Chen.

U.S. Appl. No. 16/668,945, filed Oct. 30, 2019, Li.

\* cited by examiner

US 11,386,212 B2

SECURE MULTI-PARTY COMPUTATION WITH NO TRUSTED INITIALIZER

CROSS-REFERENCE TO RELATED APPLICATIONS

This application is a continuation of PCT Application No. PCT/CN2019/081385, filed on Apr. 4, 2019, which is hereby incorporated by reference in its entirety.

TECHNICAL FIELD

This specification relates to collaborative computation (e.g., secure multi-party computation (MPC)) between two or more parties without disclosing private or sensitive data of individual parties.

BACKGROUND

With the development of technology and data analysis, many online platforms collect different types of data. For example, movie rating platforms collect rating data from the users, while social media platforms collect social network data form the users. These collected data are valuable and are usually kept as private information by the respective platforms. The platforms are paying more and more attention to data privacy and do not necessarily want to share their collected data, at least not in its original form. It would be desirable to allow collaborative computation among multiple platforms without disclosing private or sensitive data of each individual party.

SUMMARY

This specification describes technologies for secure collaborative computation (e.g., secure multi-party computation (MPC)) between two or more parties without disclosing private or sensitive data of each individual party. These technologies generally involve collaborative computation between two or more parties via a secret sharing scheme without a trusted initializer while protecting private or sensitive data of each individual party. The secret sharing scheme allows the parties to perform local computation. In the secret sharing scheme, the results of the local computation are scrambled private data (also referred to as manipulated data) that do not disclose the private or sensitive information of each individual party. The results of the local computation are shared between the parties and are used for collaborative computation. The collaborative computation via the secret sharing scheme does not require a trusted initializer, which reduces the cost and improve the efficiency and flexibility of the collaborative computation.

This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
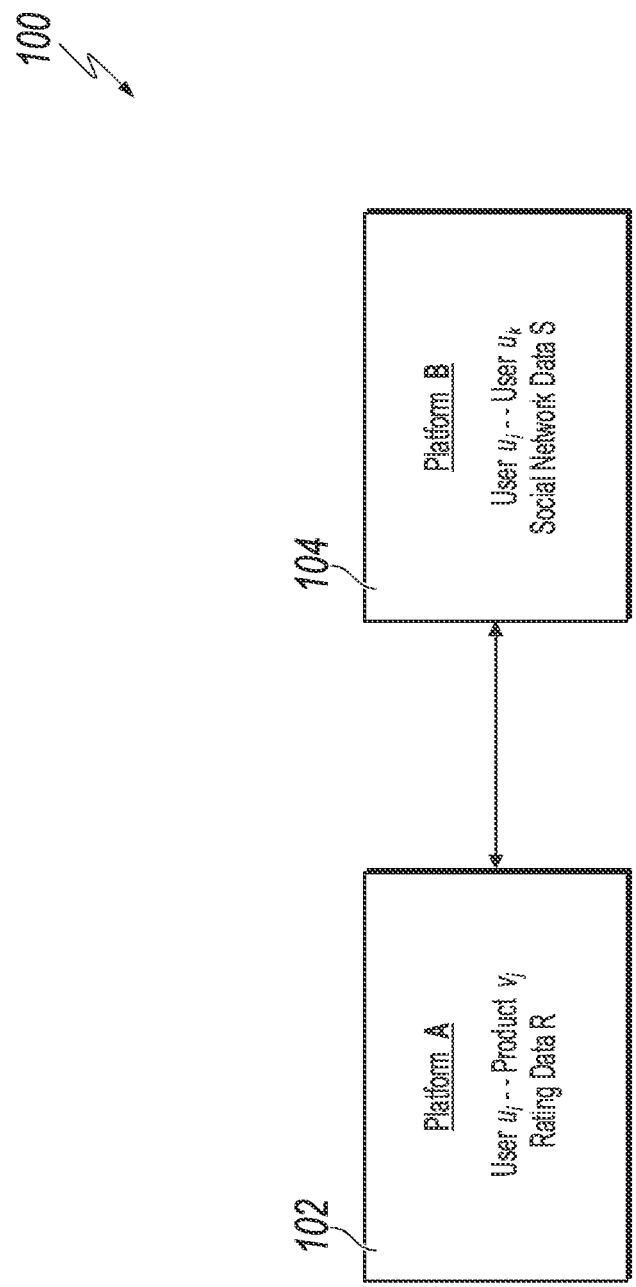
FIG. 1 is a block diagram illustrating an example system for secret sharing between platform A and platform B without a trusted initializer, according to an embodiment of this specification.

This specification describes technologies for collaborative computation (e.g., secure multi-party computation (MPC)) between two or more parties without disclosing private or sensitive data of each individual party. These technologies generally involve collaborative computation between two or more parties via a secret sharing scheme without a trusted initializer while protecting private or sensitive data of each individual party. The secret sharing scheme allows the parties to perform local computation. In the secret sharing scheme, the results of the local computation are scrambled private data (also referred to as manipulated data) that do not disclose the private or sensitive information of each individual party. The results of the local computation are shared between the parties and are used for collaborative computation. The collaborative computation via the secret sharing scheme does not require a trusted initializer, which reduces the cost and improve the efficiency and flexibility of the collaborative computation.

Secret sharing includes methods for distributing a secret among two or more participants, each of whom is allocated a share of the secret. The secret can be reconstructed only when a sufficient number, of possibly different types, of shares are combined together; individual shares are of no use on their own. In other words, individual participants cannot recover secret information; only a few participants collaborate together can recover the secret.

Secret sharing methods can be generally divided into two categories, one with a trusted initializer (trust initiating party) and one without a trusted initializer. For secret sharing with a trusted initializer, at the beginning, the trusted initializer is needed to initialize parameters of parties participating in multi-party security calculation, for example, by generating random numbers that meet certain conditions. For secret sharing without a trusted initializer, no such a third party initializer is needed. Each party participating in multi-party security calculation can locally generate random numbers needed to ensure the data security and complete multi-party security calculation by certain data exchange protocols.

In some embodiments, parties participating in multi-party security calculation can include, for example, one or more platforms or other entities. Among many online platforms, different platforms can accumulate different types of data. For example, an item rating and recommendation platform such as NETFLIX or IMDB accumulates rating data from users regarding movies and TV series. A social media or social network platform such as FACEBOOK or TWITTER accumulates social network data from the users and their friends. Social information can improve the performance of a recommendation system because close friends tend to have similar preferences. Existing social based recommendation methods assume that the user rating data of an item and the social data between the users are shared. However, due to data privacy or other concerns, the online platforms typically do not share their original data with other parties.

Example techniques are described that allow platforms to securely collaborate in building an improved recommendation system based on both the rating data and the social network data, without disclosing each platform's private data to the other. For example, a social recommendation model can be trained based on both the rating data and the social network data via a secret sharing scheme between an item rating and recommendation platform and a social network platform. Under the secret sharing scheme, the data exchanged between the platforms are in a manipulated form, rather than their original form. The exchanged data are manipulated such that one cannot recover or decode the original data from the manipulated data.

The secret sharing scheme is different from encoding, encryption or other schemes for secured data transmission in which a data source (e.g., as a transmitter) encodes or encrypts original data into an encoded form before transmission, and an intended recipient can decode or recover the original data from the received encoded data, for example, based on a known security key or a corresponding decoding algorithm. The secret sharing scheme protects the original data from being known even by an intended recipient. As such, the data source can preserve the privacy of the original data.

The secret sharing scheme thus encourages collaboration between different platforms and can help achieve mutual benefits, without compromising data privacy. For example, with the disclosed secret sharing scheme, the item rating and recommendation platform can leverage social network information from the social network platform to better predict a user's needs and provide targeted recommendations to users, resulting in enhanced user experience and potential profit returns to the item rating and recommendation platform.

FIG. 1 is a block diagram illustrating an example system 100 for secret sharing between platform A 102 and platform B 104, according to an embodiment of this specification. Platform A 102 can include, but is not limited to, an item rating and recommendation platform in entertainment, retail, service, and other industry or sectors where the users can rate products, services, or other items. Examples of an item rating and recommendation platforms include, for example, AMAZON, NETFLIX, or IMDB platforms. Platform A 102 can collect rating data R from its users. The rating data R can include one or more actual ratings of one or more items (e.g., products or services) given by the users, or one or more mapped ratings based on user's clicks, purchases, searches, or other historic activities with respect to the items. The ratings can reflect the user's needs, fondness, or preferences of the items. The ratings can have a specific range (e.g., [0, 1], or [1, 5]). In some embodiments, the rating data R can be represented in a matrix having a dimension of M*N, where M represents the number of users and N represents the number of items, with entries $R_{ij}$ representing a rating of item j by user i.

Platform A 102 can also include user data, which can include, for example, user's names, ages, genders, addresses, or any other account or profile information, purchase histories, browsing histories, or search histories of the users at the platform A 102. Platform A 102 can also include item data, which can include, for example, names, categories, prices, keywords, instructions, etc. related to the items.

In some embodiments, the collected rating data R can be a sparse matrix, because only a small number (compared to M*N) of entries $R_{ij}$ having the rating or mapped rating based on existing user activities relative to the items. In some embodiments, platform A 102 can predict known ratings of items so as to provide targeted recommendations of items to users. In some embodiments, platform A 102 can predict known ratings of items, for example, based on the user data and the item data according to machine learning or statistics algorithms. As an example, platform A 102 can provide recommendations of items based on user-feature data U (also referred to as user factor data) and item-feature data V (also referred to as item factor data) according to matrix factorization methods or other techniques. Specifically, each user (e.g., user i) can be characterized by a vector (e.g., $U_i$) of user features such as age, gender, geo-location, visit pattern, etc. Each item (e.g., item j) can be characterized by a vector (e.g., $V_j$) of item features such as category, keywords, topics, prices, etc. The user features and item features can be factors that impact a given user's rating, selection, or purchase of a given item. In some embodiments, a rating of an item given by a user can be approximated by a dot product of the vector of user features and the vector of item features. For example, $$R_{ij} \approx U_i^T V_j \tag{1}$$

where $U_i$ represents a vector of the user-feature data corresponding to user i; $V_j$ represents a vector of the item-feature data corresponding to item j; and $R_{ij}$ represents a rating of item j by user i.

In some embodiments, the user feature vector (e.g., $U_i$) and the item feature vector (e.g., $V_j$) are latent vectors which can be learned from training data (e.g., known rating data).

Platform B 104 can include, but is not limited to, a social media platform (such as, FACEBOOK, TWITTER, or INSTRAGRAM). Platform B 104 can collect social network data S from its users. The social network data can include, for example, names, ages, genders, addresses, jobs, relationships, hobbies, statuses, comments, blogs, browsing history, or other demographic, employment, recreational information of a user at the platform B and corresponding information of the user's friends, family, co-workers, etc. Such social network data S can be informative to platform A for predicting a user's rating of an item and providing recommendations.

For example, the platform A can predict user's ratings by solving an optimization problem as shown in formula (2):

$$\underset{U_i, V_j}{\operatorname{argmin}} L = \sum_{u_i \in u, v_j \in v} (R_{ij} - U_i^T V_j)^2 + \lambda_1 \sum_{u_i, u_k \in u} S_{ik}(U_i - U_k)^2 + \lambda_2 \left( \left\| \sum_{u_i \in u} U_i \right\|^2 + \left\| \sum_{v_j \in v} V_i \right\|^2 \right) \quad (2)$$

where $S_{ik}$ represents a social relationship between user i and user k in the social network data S; $\lambda_1$ represents a predefined weight associated with the social network data; and $\lambda_2$ represents a predefined weight to prevent overfitting.

In this example, the objective function on the right hand side of the formula (2) includes 3 terms. The first term $\Sigma u_{i \in u, vj \in v}(R_{ij} - U_i^T V_j)^2$ represents the error or distance between the known rating data and the approximated rating computed based on the user-feature data (e.g., $U = [U_1, U_2, \ldots, U_M]$) and the item-feature data (e.g., $V = [V_1, V_2, \ldots, V_N]$). The second term $\lambda_1 \Sigma u_{i, uk \in u} S_{ik}(U_i - U_k)^2$ represents the effects of social network data S on the user feature vectors. For example, the closer or stronger social relationship of two users, the more similar the two users-feature vectors. In some embodiments, the larger $S_{ik}$, the closer or stronger social relationship of two users. The third term $\lambda_2(\|u_{i \in u}U_i\|^2 + \|\Sigma v_{j \in v}V_i\|^2)$ is used to prevent overfitting. The values of weights $\lambda_1$ and $\lambda_2$ can be pre-determined. The larger the weight, the more impact of a corresponding term on the objective function.

The above optimization problem to minimize the objective function can be solved, for example, by gradient descent or another algorithm. For example, taking derivative of the latent vectors U and V can result in the below two equations (2).

$$\frac{\partial L}{\partial_U} = (UV - R)V + 2\lambda_1 U \cdot \operatorname{diag}(S \cdot I_M) + 2\lambda_1 U \cdot S + \lambda_2 U \quad (3)$$

$$\frac{\partial L}{\partial_V} = (UV - R)U + \lambda_2 V \quad (4)$$

To solve for U and V in the above equations (3) and (4), results of matrix products $U \cdot \operatorname{diag}(S \cdot I_M)$ and $U \cdot S$ suffice, without the need to know values of U and S individually. As such, a secret sharing scheme can be used by the platforms A and B to obtain the results of matrix products $U \cdot \operatorname{diag}(S \cdot I_M)$ and $U \cdot S$. Under the secret sharing scheme, the platform A can disclose the manipulated U to the platform B without disclosing the original U to the platform B; and the platform B can disclose the manipulated S to the platform A without disclosing the original S to the platform A.

In some embodiments, the secret sharing scheme can be implemented with or without a trust initializer. With a trust initializer, a common initial point can be established by the trust initializer and sent to the two platforms to assist their data exchange. Without a trust initializer, the two platforms can each generate random numbers as their respective initial points to assist their data exchange. The platforms could benefit from collaboration without sharing sensitive private information.

Figure 2:
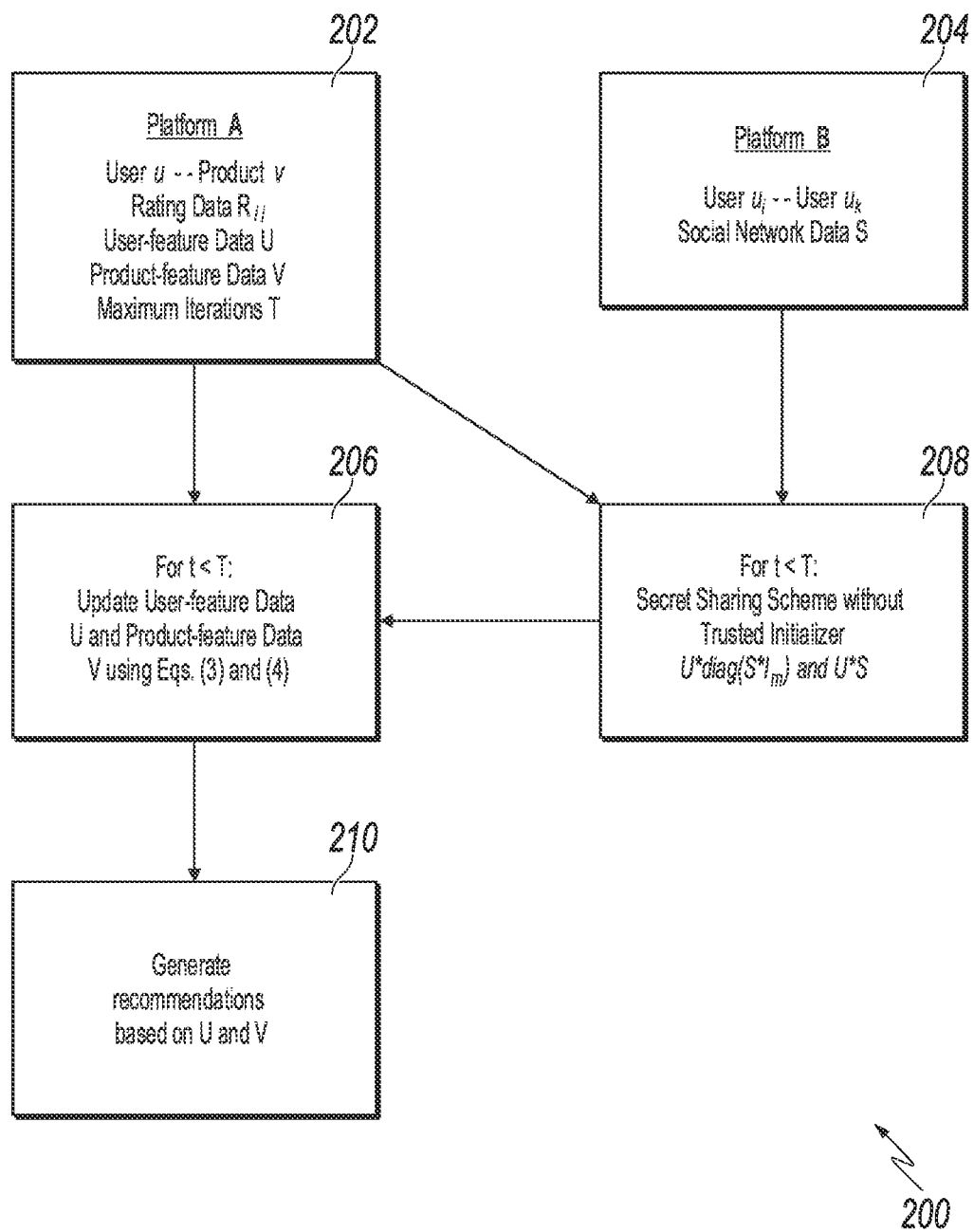
FIG. 2 is a flowchart illustrating an example secret sharing method between platform A and platform B without a trusted initializer for generating recommendations by platform A, according to an embodiment of this specification.

FIG. 2 is a flowchart illustrating an example secret sharing method 200 between platform A and platform B without a trusted initializer for generating recommendations by platform A, according to an embodiment of this specification. The platform A can be the platform A described in FIG. 1, and platform B can be the platform B described in FIG. 1. In some embodiments, the example secret sharing method can be implemented in an iterative algorithm. The number of iterations T can be, for example, a pre-determined value or determined based on certain criteria (e.g., whether the algorithm converges or updates or differences of U or V after different iterations are below a threshold). At 202, the platform A identifies user rating data R and initial user-feature data U and item-feature data V, and the number of iterations T. At 204, the platform B identifies the social network data S. For a t-th iteration (t<T), at 208, the platform A and platform B can perform a secret sharing scheme without a trusted initializer to obtain the matrix products $U \cdot \operatorname{diag}(S \cdot I_M)$ and $U \cdot S$. At 206, the platform A updates the U or V based on the matrix products $U \cdot \operatorname{diag}(S \cdot I_M)$ and $U \cdot S$, for example, according to Equations (3) and (4). After T iterations, at 210, the platform A item-feature generates recommendations based on the updated user-feature data U and item-feature data V.

In some embodiments, let matrix Z as a product of matrix A and matrix B. That is $Z = A \cdot B$. $Z_1$ represents the entry/element of Z in the i-th row and j-th column. $Z_{ij}$ can be computed, for example, according to Equation (5). The matrix products $U \cdot \operatorname{diag}(S \cdot I_M)$ and $U \cdot S$, For example, $$Z_{ij} = A_i^T B_j \quad (5)$$

where $A_i^T$ represents the i-th row of matrix A, and $B_j$ represent the j-th column of matrix B.

Figure 3:
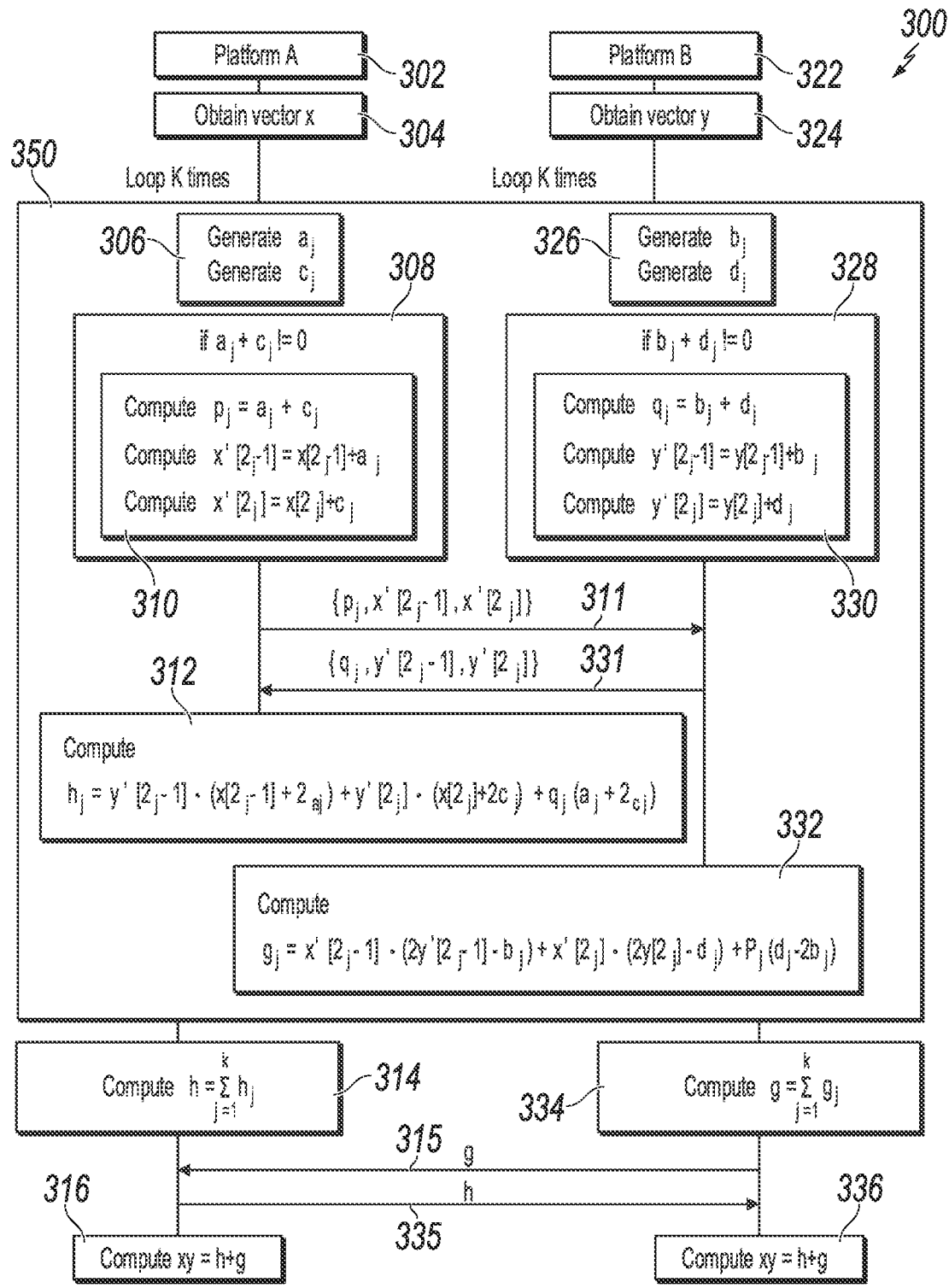
FIG. 3 is a flowchart illustrating an example secret sharing method between platform A and platform B for computing an element $Z_{ij}$ of a matrix product of matrix A and matrix B using a secret sharing scheme without a trusted initializer, according to an embodiment of this specification.

FIG. 3 is a flowchart illustrating an example secret sharing method 300 between platform A and platform B for computing an element $Z_{ij}$ of a product of matrix A and matrix B using a secret sharing scheme without a trusted initializer, according to an embodiment of this specification. In a secret sharing scheme without a trusted initializer, both platforms generate random numbers in series of steps and computations that would replace the need for a trusted initializer.

At 304, platform A 302 obtains an initial vector x=(x1, x2,. . .,x_2k), which can be $A_i^T$, the i-th row of matrix A. At 324, platform B 322 obtains an initial vector y=(y1, y2,. . .,y_2k), which can be $B_j$ represent the j-th column of matrix B. The vectors x and y can have the same dimension of 2k. The vectors x and y can include, for example, random variables, all zeros, predetermined values, or other initial values.

In some embodiments, both platforms A and B compute for the output by looping k times 350. At the k-th iteration, at 306, platform A 302 generates random values $a_j$ and $c_j$ such that the sum $(a_j+c_j)$ is not equal to 0. For example, the random generated values $a_j$ and $c_j$ can be repeatedly generated until $a_j+c_j$ is not equal to 0 as shown in 308. When $a_j+c_j$ is found to not be equal 0, platform A 302 computes values that will be manipulated and later sent to platform B 322.

The computed values for platform A 302 can include, but are not limited to, $p_j=a_j+c_j$, $x'_{[2j-1]}=x_{[2j-1]}+a_j$, and $x'_{[2j]}=x_{[2j]}+c_j$ as shown in 310. At 311, the values, $\{p_j, x'_{[2j-1]}, x'_{[2j]}\}$, are sent to platform B 322 for computation. Similarly, at 326, platform B 322 generates random values $b_j$ and $d_j$ such that the sum $(b_j+d_j)$ is not equal to 0. For example, the random generated values $b_j$ and $d_j$ can be repeatedly generated until $b_j+d_j$ is not equal to 0 as shown in 328. The computed values for platform B 322 can include, but are not limited to, $q_j=b_j+y'_{[2j-1]}=y_{[2j-1]}+b_j$, and $y'_{[2j]}=y_{[2j]}+d_j$ as shown in 330. At 331, the values, $\{q_j, y'_{[2j]}, y'_{[2j-1]}\}$, are sent to platform A 302 for computation.

After the platforms send manipulated data to each other, while still in the k loop, both platform compute values that ultimately sum up to the output values. Platform A 302 computes $h_j=y'_{[2j-1]}(x_{[2j-1]}+2a_j)+y'_{[2j]}(x_{[2j]}+2c_j)+q_j+2c_j$ as shown in 312. Platform B 322 computes for $g_j=x'_{[2j-1]}(2y'_{[2j-1]}-b_j)+x'_{[2j]}(2y_{[2j]}-d_j)+p_j(d_j-2b_j)$ as shown in 332. At 314, platform A 302 obtains a value h by summing up all of the $h_j$, that is, $h=\Sigma_{j=1}^{k}h_j$, as shown in 314. At 332, platform B 322 obtains a value g by summing up all of the $g_j$, that is, $g=\Sigma_{j=1}^{k}g_j$, as shown in 334.

At 315, platform A can receive value g from platform B. The sum of h and g is equal to the product of vectors x and y. That is, xy=h+g. As such, at 315, platform A receives the value g from platform B. At 335, platform A sends the value h to platform B. At 316, platform A can compute a product of vectors x and y by computing a sum of h and g, which are the manipulated data of the vectors x and y. Similarly, at 336, platform B can also compute the product of vectors x and y by computing a sum of h and g.

Given that x can be the i-th row of matrix A, $A_i^T$, and y can be the j-th column of matrix B, $B_j$, the element $Z_{ij}$ of the product of matrix A and matrix B can be obtained as $Z_{ij}=A_i^T B_j=xy$. Accordingly, the matrix product Z of matrix A and matrix B can be obtained.

By substituting matrix U with A, and substituting diag $(S \cdot I_M)$ with B, the matrix product $U \cdot \text{diag}(S \cdot I_M)$ can be obtained. Similarly, by substituting matrix U with A, and substituting S with B, the matrix product U •S can be obtained. With the matrix products $U \cdot \text{diag}(S \cdot I_M)$ and U·S, platform A can update the U or V, for example according to Equations (3) and (4), as described with respect to 206 in FIG. 2.

Thus, platform A 302 can generate predicted rating data based on the updated user-feature data and item-feature data. In some embodiments, platform A 302 can, among other things, generate recommendations for a particular item for a particular customer based on the predicted rating data. The above described techniques and computation can be achieved without the need of a trusted authority as overhead.

Figure 4:
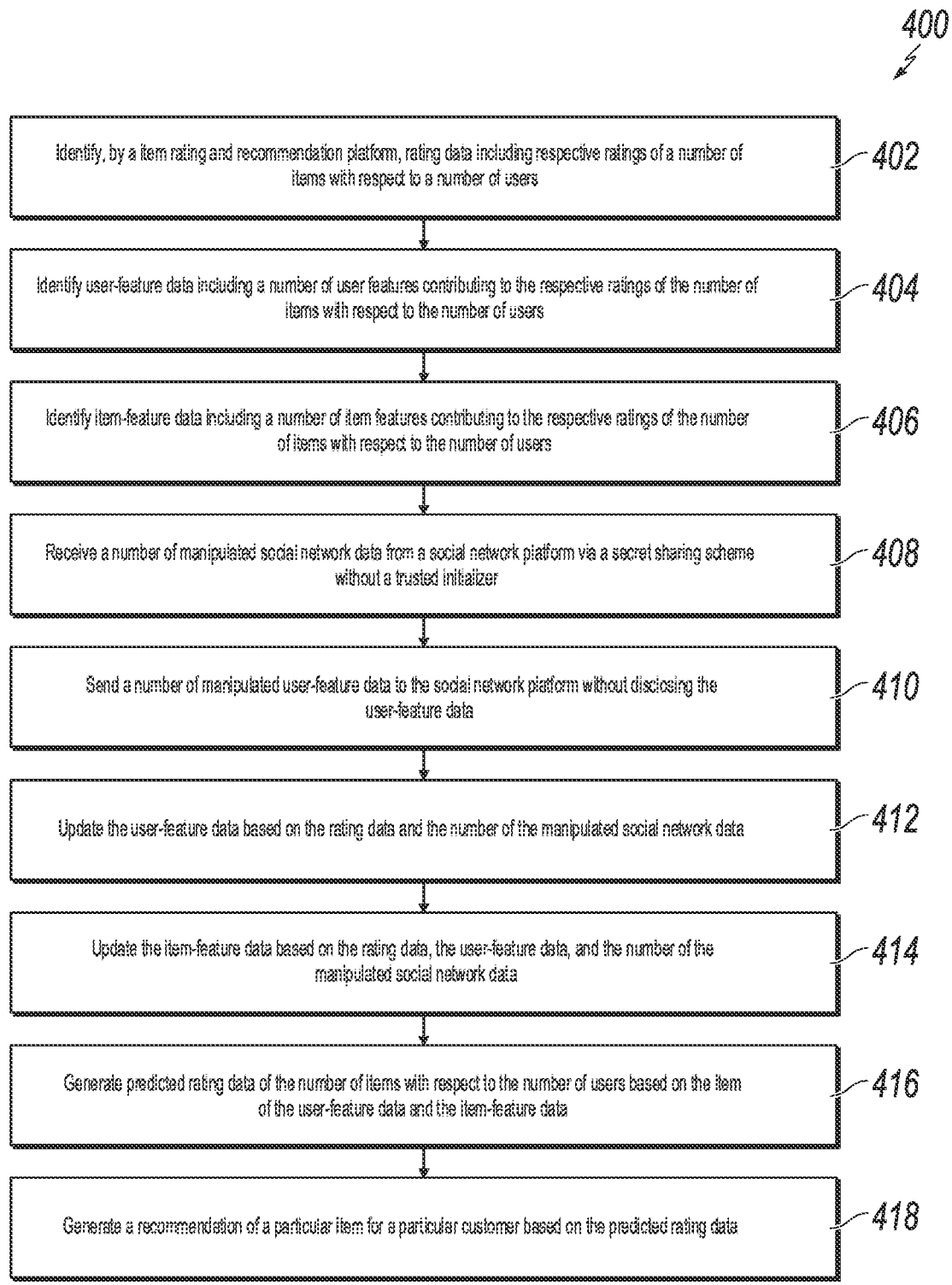
FIG. 4 is a flowchart illustrating an example method for generating a recommendation by an item rating and recommendation platform using a secret sharing scheme without a trusted initializer, according to an embodiment of this specification.

FIG. 4 is a flowchart of an example method 400 for generating a recommendation to a user by an item rating and recommendation platform using a secret sharing scheme without a trusted initializer, according to an embodiment. For clarity of presentation, the description that follows generally describes method 400 in the context of the other figures in this description. For example, the item rating and recommendation platform can be platform A as described with respect to FIGS. 1-3. However, it will be understood that method 400 may be performed, for example, by any suitable system, environment, software, and hardware, or a combination of systems, environments, software, and hardware, as appropriate. In some embodiments, various steps of method 400 can be run in parallel, in combination, in loops, or in any order.

At 402, rating data including, but not limited to, respective ratings of a number of items with respect to a number of users, is identified by the item rating and recommendation platform. Identifying the rating data includes receiving (e.g., from another device), retrieving or loading from a memory, or determining the rating data based on one or more inputs to method 400. The rating data can include rating data R described with respect to FIGS. 1-3. For example, the rating data can include actual rating or mapped rating based on existing user activities relative to the items. From 402, method 400 proceeds to 404.

At 404, user-feature data including a number of user features contributing to the respective ratings of the number of items with respect to the number of users are identified by the item rating and recommendation platform. Identifying the user-feature data includes receiving (e.g., from another device), retrieving or loading from a memory, or determining the user-feature data based on one or more inputs to method 400. In some embodiments, the user-feature data can be represented by a matrix U. The user-feature data can include user-feature data U described with respect to FIGS. 1-3. From 404, method 400 proceeds to 406.

At 406, item-feature data including a number of item features contributing to the respective ratings of the number of items with respect to the number of users are identified by the item rating and recommendation platform. In some embodiments, identifying the item-feature data includes receiving (e.g., from another device), retrieving or loading from a memory, or determining the item-feature data based on one or more inputs to method 400. The item-feature data can include item-feature data V described with respect to FIGS. 1-3. From 406, method 400 proceeds to 408.

At 408, the item rating and recommendation platform receives a number of manipulated social network data (e.g., g described with respect to FIG. 3) computed based on social network data (e.g., y, a vector of the social network data matrix S) from a social network platform via a secret sharing scheme without a trusted initializer from a social network platform. Further, the social network data indicate social relationships between any two of the number of users. In the secret sharing scheme without the trust initializer, the social network platform shares with the item rating and recommendation platform the number of manipulated social network data (e.g., g) without disclosing the social network data (e.g., y), where the manipulated social network data are computed based on the social network data and a first number of random variables (e.g., $b_j$, $d_j$). In some embodiments, in the secret sharing scheme without the trusted initializer, the item rating and recommendation platform shares with the social network platform a number of manipulated user-feature data (e.g., h) without disclosing the user-feature data (e.g., x, a vector of the user-feature data matrix U), where the number of manipulated user-feature data are computed based on the user-feature data and a second number of random variables (e.g., $a_j$, $c_j$). In some embodiments, the manipulated social network data are manipulated such that one cannot recover the original social network data from the manipulated social network data.

In some embodiments, the secret sharing scheme without the trusted initializer is used for solving an optimization problem as described with respect to formula (2), for example, as described with respect to FIG. 3. For example, in the secret sharing scheme without the trusted initializer, the item rating and recommendation platform obtains a vector of the user-feature data (e.g., x) and generates first manipulated user-feature data (e.g., x') based on the vector of the user-feature data (e.g., x) and a second number of random variables (e.g., $a_j$, $c_j$). The item rating and recommendation platform transmits to the social network platform first manipulated user-feature data (e.g., x') and receives from the social network platform first manipulated social network data (e.g., y') computed based on the social network data (e.g., y) and the first number of random variables (e.g., $b_j$, $d_j$).

The item rating and recommendation platform can generate one of the manipulated user-feature data (e.g., h) based on two or more of the first manipulated user-feature data (e.g., x'), the first manipulated social network data (e.g., y'), or the second number of random variables (e.g., $a_j$, $c_j$). Similarly, the social network platform can generate one of the manipulated social network data (e.g., g) computed based on two or more of the first manipulated user-feature data (e.g., x'), the first manipulated social network data (e.g., y'), or the first number of random variables (e.g., $b_j$, $d_j$). From 408, method 400 proceeds to 410.

At 410, the item rating and recommendation platform sends a number of the manipulated user-feature data (e.g., a number of h) to the social network platform without disclosing the user-feature data (e.g., x or any vector of U), for example, as described with respect to FIG. 3. From 410, method 400 proceeds to 412.

At 412, the item rating and recommendation platform updates the user-feature data based on the rating data and the number of the manipulated social network data. In some embodiments, updating the user-feature data includes computing a product of the user-feature data and the social network data by computing a sum of one of the number of the manipulated user-feature data (e.g., h) and one of the number of the manipulated social network data (e.g., g). Further, the mentioned computation can include computing for each entry in the product of the user-feature data and the social network data and computing one of the number of the manipulated user-feature data and one of the number of the manipulated social network data without the social network data. In some embodiments, the user-feature data includes solving an optimization problem to minimize a weighted sum of a difference between the predicted rating data and rating data, the user-feature data weighted by the social network data, and an overfitting-preventing term, for example, as shown in formula (2). In some embodiments, updating the user-feature data includes updating the user-feature data according to the example techniques described with respect to FIG. 3. From 412, method 400 proceeds to 414.

At 414, the item rating and recommendation platform updates item-feature data based on the rating data and the user-feature data, for example, according to the example techniques described with respect to FIG. 3. From 414, method 400 proceeds to 416.

At 416, predicted rating data of the number of items with respect to the number of users based on the product of the user-feature data and the item-feature data are generated. In some embodiments, the predicted rating data can be generated, for example, based on the product of the user-feature data and the item-feature data, according to equation (1). In some embodiments, the generated rating can be better aligned with the users' needs or preferences because of the incorporation of the social network. From 416, method 400 proceeds to 418

At 418, a recommendation of a particular item for a particular user based on the predicted rating data is generated. In some embodiments, one or more items with top predicted ratings with respect to the particular user can be recommended to the particular user. The recommendation of a particular item can be a recommendation of a movie or a shopping item. For example, NETFLIX can better recommend a movie or AMAZON can better recommend an item based on the social network data. In some embodiments, the recommendation of the particular item for the particular item can be output, for example, via a user interface (UI). In some embodiments, the selected topics can be displayed in a chat box, a pop window, etc. in a graphic user interface (GUI) or other UIs for the user's review and consideration. From 418, method 400 stops.

Figure 5:
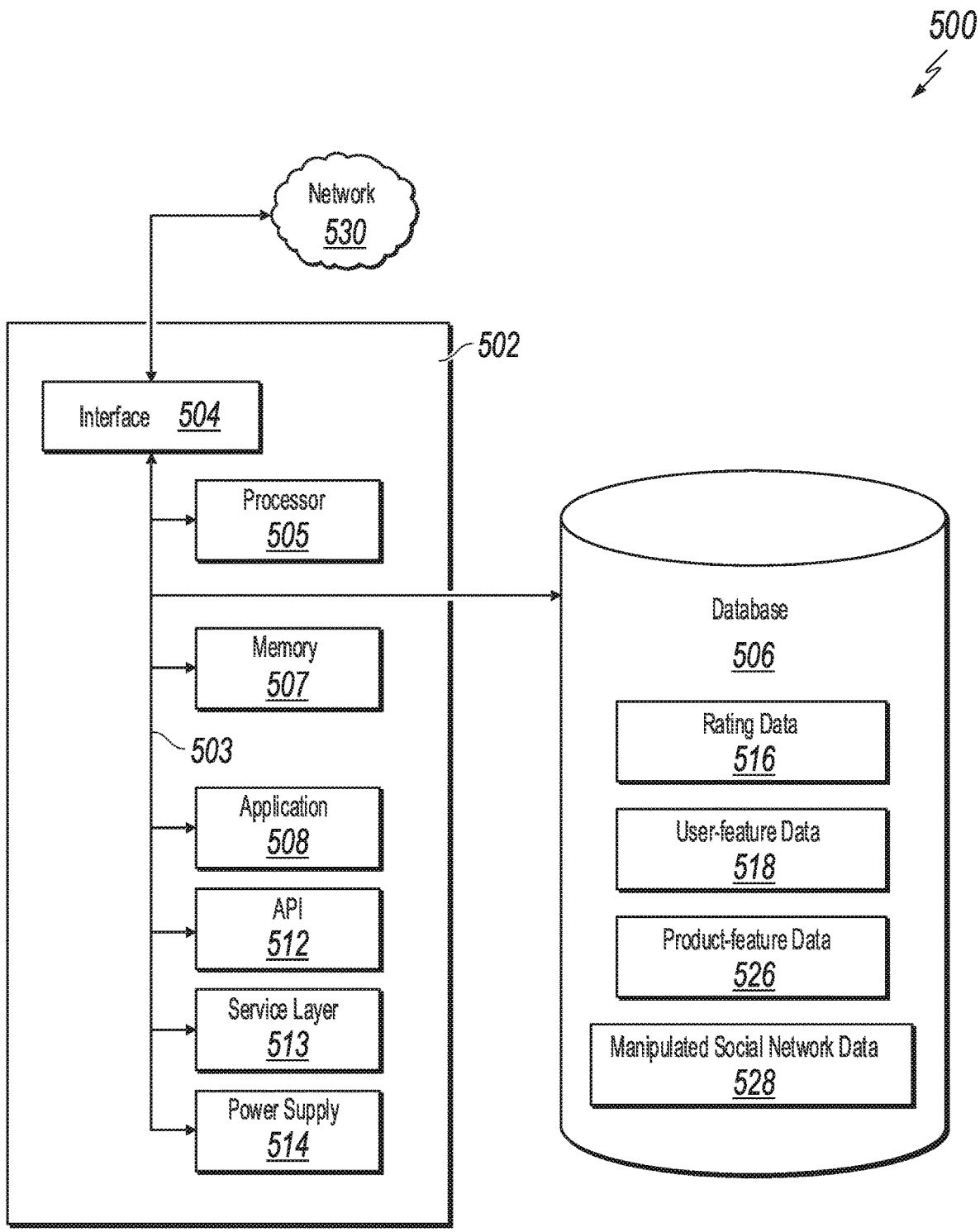
FIG. 5 is a block diagram illustrating an example computer system used to provide computational functionalities associated with described algorithms, methods, functions, processes, flows, and procedures as described in the instant disclosure, according to an embodiment of this specification.

FIG. 5 is a block diagram of an example computer system 500 used to provide computational functionalities associated with described algorithms, methods, functions, processes, flows, and procedures, as described in the instant disclosure, according to an embodiment. The illustrated computer 502 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 502 may include a computer that includes an input device, such as a keypad, keyboard, touch screen, or other device that can accept user information, and an output device that conveys information associated with the operation of the computer 502, including digital data, visual, or audio information (or a combination of information), or a graphical-type user interface (UI) (or GUI).

The computer 502 can serve in a role as a client, network component, a server, a database or other persistency, or any other component (or a combination of roles) of a computer system for performing the subject matter described in the instant disclosure. The illustrated computer 502 is communicably coupled with a network 530. In some embodiments, one or more components of the computer 502 may be configured to operate within environments, including cloud-computing-based, local, global, or other environment (or a combination of environments).

At a high level, the computer 502 is an electronic computing device operable to receive, transmit, process, store, or manage data and information associated with the described subject matter. According to some embodiments, the computer 502 may also include or be communicably coupled with an application server, e-mail server, web server, caching server, streaming data server, or other server (or a combination of servers).

The computer 502 can receive requests over network 530 from a client application (for example, executing on another computer 502) and respond to the received requests by processing the received requests using an appropriate software application(s). In addition, requests may also be sent to the computer 502 from internal users (for example, from a command console or by other appropriate access method), external or third-parties, other automated applications, as well as any other appropriate entities, individuals, systems, or computers.

Each of the components of the computer 502 can communicate using a system bus 503. In some embodiments, any or all of the components of the computer 502, hardware or software (or a combination of both hardware and software), may interface with each other or the interface 504 (or a combination of both), over the system bus 503 using an application programming interface (API) 512 or a service layer 513 (or a combination of the API 512 and service layer 513). The API 512 may include specifications for routines, data structures, and object classes. The API 512 may be either computer-language independent or dependent and refer to a complete interface, a single function, or even a set of APIs. The service layer 513 provides software services to the computer 502 or other components (whether or not illustrated) that are communicably coupled to the computer 502. The functionality of the computer 502 may be accessible for all service consumers using this service layer. Software services, such as those provided by the service layer 513, provide reusable, defined functionalities through a defined interface. For example, the interface may be software written in JAVA, C++, or other suitable language providing data in extensible markup language (XML) format or other suitable format. While illustrated as an integrated component of the computer 502, alternative embodiments may illustrate the API 512 or the service layer 513 as stand-alone components in relation to other components of the computer 502 or other components (whether or not illustrated) that are communicably coupled to the computer 502. Moreover, any or all parts of the API 512 or the service layer 513 may be implemented as child or sub-modules of another software module, enterprise application, or hardware module without departing from the scope of this disclosure.

The computer 502 includes an interface 504. Although illustrated as a single interface 504 in FIG. 5, two or more interfaces 504 may be used according to particular needs, desires, or particular embodiments of the computer 502. The interface 504 is used by the computer 502 for communicating with other systems that are connected to the network 530 (whether illustrated or not) in a distributed environment. Generally, the interface 504 includes logic encoded in software or hardware (or a combination of software and hardware) and is operable to communicate with the network 530. More specifically, the interface 504 may include software supporting one or more communication protocols associated with communications such that the network 530 or interface's hardware is operable to communicate physical signals within and outside of the illustrated computer 502.

The computer 502 includes a processor 505. Although illustrated as a single processor 505 in FIG. 5, two or more processors may be used according to particular needs, desires, or particular embodiments of the computer 502. Generally, the processor 505 executes instructions and manipulates data to perform the operations of the computer 502 and any algorithms, methods, functions, processes, flows, and procedures as described in the instant disclosure.

The computer 502 also includes a database 506 that can hold data for the computer 502 or other components (or a combination of both) that can be connected to the network 530 (whether illustrated or not). For example, database 506 can be an in-memory, conventional, or other type of database storing data consistent with this disclosure. In some embodiments, database 506 can be a combination of two or more different database types (for example, a hybrid in-memory and conventional database) according to particular needs, desires, or particular embodiments of the computer 502 and the described functionality. Although illustrated as a single database 506 in FIG. 5, two or more databases (of the same or combination of types) can be used according to particular needs, desires, or particular embodiments of the computer 502 and the described functionality. While database 506 is illustrated as an integral component of the computer 502, in alternative embodiments, database 506 can be external to the computer 502. As illustrated, the database 506 holds previously described rating data 516, user-feature data 518, item-feature data 526 and social network data 528.

The computer 502 also includes a memory 507 that can hold data for the computer 502 or other components (or a combination of both) that can be connected to the network 530 (whether illustrated or not). Memory 507 can store any data consistent with this disclosure. In some embodiments, memory 507 can be a combination of two or more different types of memory (for example, a combination of semiconductor and magnetic storage) according to particular needs, desires, or particular embodiments of the computer 502 and the described functionality. Although illustrated as a single memory 507 in FIG. 5, two or more memories 507 (of the same or combination of types) can be used according to particular needs, desires, or particular embodiments of the computer 502 and the described functionality. While memory 507 is illustrated as an integral component of the computer 502, in alternative embodiments, memory 507 can be external to the computer 502.

The application 508 is an algorithmic software engine providing functionality according to particular needs, desires, or particular embodiments of the computer 502, particularly with respect to functionality described in this disclosure. For example, application 508 can serve as one or more components, modules, or applications. Further, although illustrated as a single application 508, the application 508 may be implemented as multiple applications 508 on the computer 502. In addition, although illustrated as integral to the computer 502, in alternative embodiments, the application 508 can be external to the computer 502.

The computer 502 can also include a power supply 514. The power supply 514 can include a rechargeable or non-rechargeable battery that can be configured to be either user- or non-user-replaceable. In some embodiments, the power supply 514 can include power-conversion or management circuits (including recharging, standby, or other power management functionality). In some embodiments, the power-supply 514 can include a power plug to allow the computer 502 to be plugged into a wall socket or other power source to, for example, power the computer 502 or recharge a rechargeable battery.

There may be any number of computers 502 associated with, or external to, a computer system containing computer 502, each computer 502 communicating over network 530. Further, the term "client," "user," and other appropriate terminology may be used interchangeably, as appropriate, without departing from the scope of this disclosure. Moreover, this disclosure contemplates that many users may use one computer 502, or that one user may use multiple computers 502.

Figure 6:
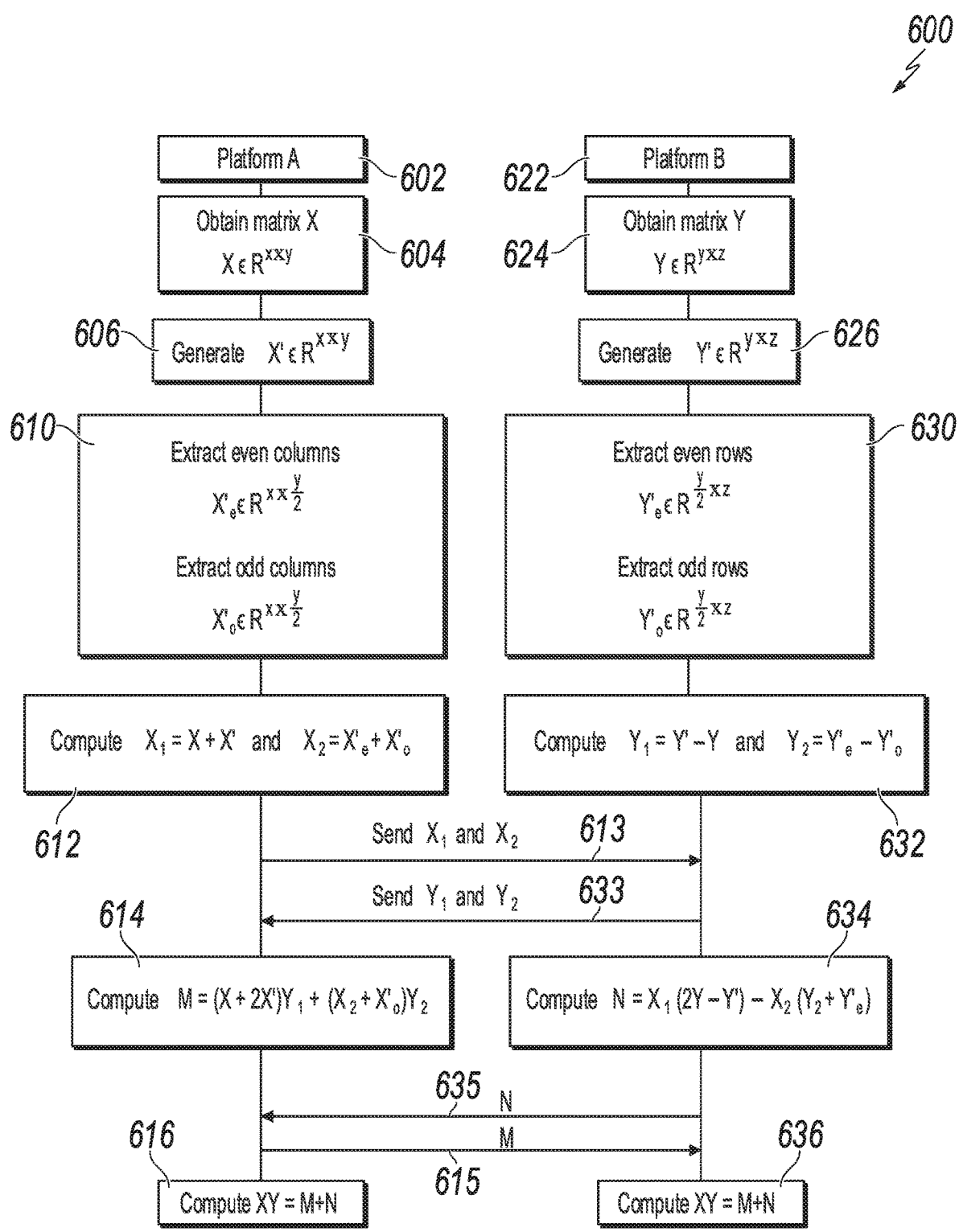
FIG. 6 is a flowchart illustrating an example secret sharing method between platform A and platform B for computing a product of matrix X and matrix Y using a secret sharing scheme without a trusted initializer, according to an embodiment of this specification.

FIG. 6 is a flowchart illustrating an example secret sharing method 600 between platform A and platform B for computing a product of matrix X and matrix Y using a secret sharing scheme without a trusted initializer, according to an embodiment of this specification. The example secret sharing method 300 is an example application of the secret sharing method 600, by replacing X with A and replacing matrix Y with B. The example secret sharing method 300 illustrates how an element $Z_{ij}$ of a matrix $Z=A \cdot B$, a product of matrix A and matrix B, is calculated, while the example secret sharing method 400 illustrates a more compact representation of how the matrix Z, the product of matrix A and matrix B, is calculated.

At 604, platform A 602 obtains or receives an input matrix $X \in R^{x \times y}$, having a dimension x×y. In some embodiments, y is an even number, y=2k. The example initial vector x=(x1, x2,. . .,x_2k) described w.r.t. 304 can an row of the matrix X'. In some embodiments, if an original input matrix $\tilde{X} \in R^{x \times \tilde{y}}$ where $\tilde{y}$ is an odd number, $\tilde{y}=2k-1$, then an all-zero column can be appended to the input matrix $\tilde{X}$ so that there are an even number of columns in the input matrix X.

At 606, platform A 602 locally generates a matrix $X' \in R^{x \times y}$, having the same dimension x×y as to the one of the input matrix X.

At 624, platform B 622 obtains or receives an input matrix $Y \in R^{x \times z}$, having a dimension y×z. The example initial vector y=(y1,y2,. . .,y_2k) described w.r.t. 304 can be a column of matrix B. In some embodiments, if an original input matrix $\tilde{Y} \in R^{\tilde{y} \times z}$ where $\tilde{y}$ is an odd number, $\tilde{y}=2k-1$, then an all-zero row can be appended to the input matrix $\tilde{Y}$ so that there are an even number of rows in the input matrix Y. Note that appending the all-zero column and row in $\tilde{X}$ and $\tilde{Y}$ does not change their matrix product, $\tilde{X} \cdot \tilde{Y} = X \cdot Y$.

At 626, platform B 602 locally generates a random matrix $Y' \in R^{y \times z}$, having a dimension y×z as to the one of the input matrix Y.

At 610, platform A 602 extracts even columns $$X'_e \in R^{x \times \frac{y}{2}}$$

and odd columns $$X'_o \in R^{x \times \frac{y}{2}}$$

from the random matrix $X' \in R^{x \times y}$, respectively.

At 630, platform B 622 extracts even rows $$Y'_e \in R^{\frac{y}{2} \times z}$$

and odd rows $$Y'_o \in R^{\frac{y}{2} \times z}$$

from the random matrix $Y' \in R^{y \times z}$, respectively.

At 612, platform A 602 computes $X_1=X+X'$ and $X_2=X'_e+X'_o$.

At 632, platform B 622 computes $Y_1=Y'-Y$ and $Y_2=Y'_e-Y'_o$.

At 613, platform A 602 sends $X_1$ and $X_2$ to platform B 622. At 633, platform B 622 sends $Y_1$ and $Y_2$ to platform A 602.

At 614, platform A 602 computes $M=(X+2X')Y_1+(X_2+X'_o)Y_2$.

At 634, platform B 622 computes $N=(2Y-Y')+X_2(Y_2+Y'_e)$.

At 615, platform A 602 sends M to platform B 622. At 635, platform B 622 sends N o platform A 602.

At 616, platform A 602 computes the matrix product XY=M+N.

At 636, platform B 622 computes the matrix product XY=M+N.

Figure 7:
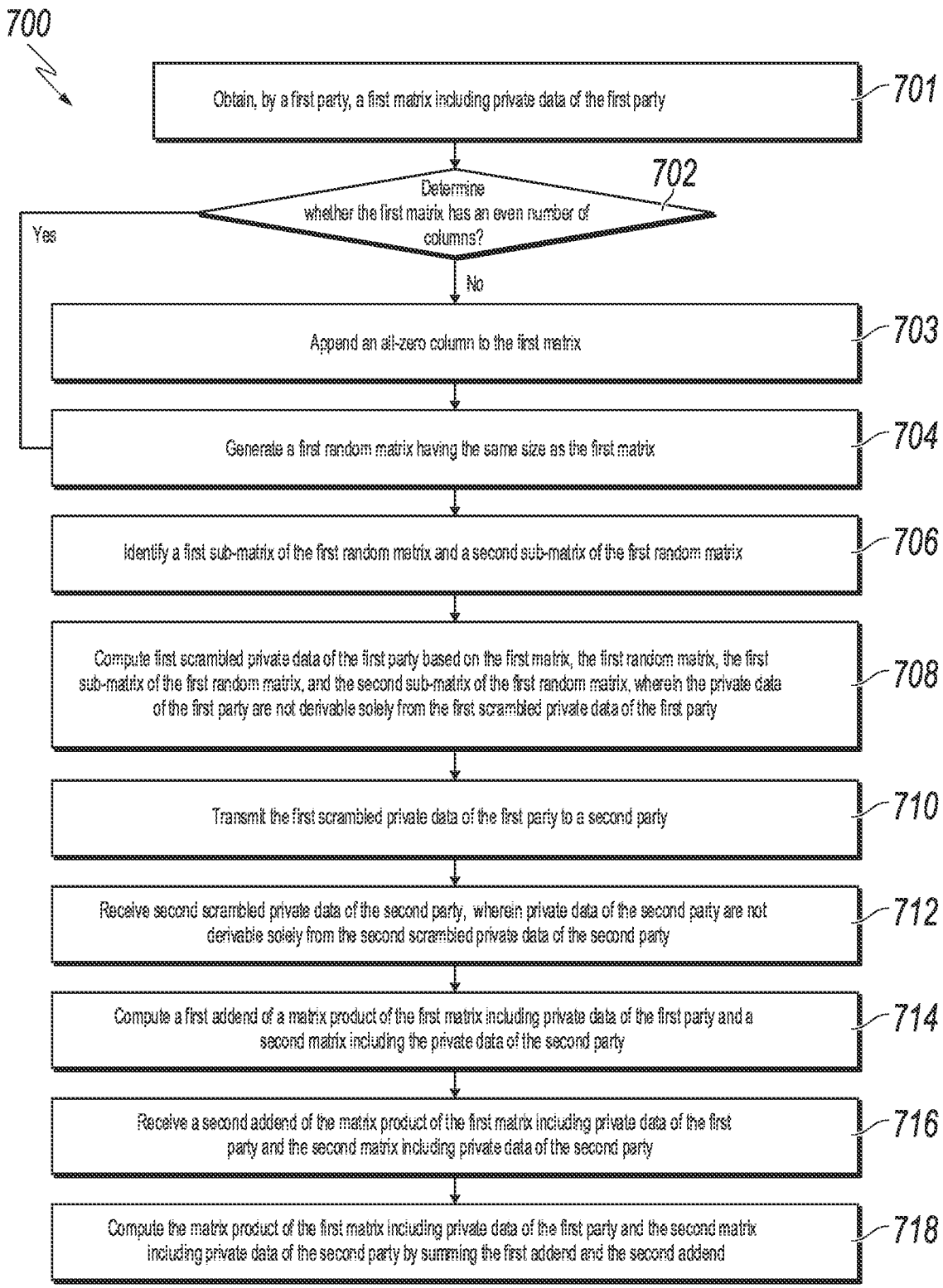
FIG. 7 is a flowchart of an example method for secure collaborative computation of a matrix product of a first matrix including private data of a first party and a second matrix including private data of the second party by secret sharing without a trusted initializer, according to an embodiment of this specification.

FIG. 7 is a flowchart of an example method 700 for secure collaborative computation of a matrix product of a first matrix including private data of a first party and a second matrix including private data of the second party by secret sharing without a trusted initializer, according to an embodiment of this specification. For clarity of presentation, the description that follows generally describes method 700 in the context of the other figures in this description. For example, the example secret sharing method 600 for computing a product of matrix X and matrix Y using a secret sharing scheme without a trusted initializer is an example embodiment of the method 700.

In some embodiments, the example method 700 can be performed by one of the parties (e.g., the first party or the second party) that participates in secret sharing to achieve the secure collaborative computation of the matrix product of the first matrix including the private data of the first party and the second matrix including the private data of the second party, without the first party accessing the private data of the second party nor the second party accessing the private data of the first party can be achieved by each party. In some embodiments, the first party can be either platform A or platform B as described with respect to FIG. 6. In some embodiments, the first party can be the item rating and recommendation platform or the social network platform as described with respect to FIGS. 1-4. In some embodiments, the matrix product of the first matrix including the private data of the first party and the second matrix including the private data of the second party can be, for example, the matrix product $U \cdot diag(S \cdot I_M)$ or $U \cdot S$ as described with respect to FIGS. 1-4. In some embodiments, the example method 700 can be used to compute other matrix products.

It will be understood that method 700 may be performed, for example, by any suitable system, environment, software, and hardware, or a combination of systems, environments, software, and hardware, as appropriate. In some embodiments, various steps of method 700 can be run in parallel, in combination, in loops, or in any order.

At 701, the first party obtains a first matrix including private data of the first party. In some embodiments, obtaining the first matrix includes receiving (e.g., from another device), retrieving or loading from a memory, or determining the first matrix based on one or more inputs to method 700.

In some embodiments, the first matrix including private data of the first party can be the matrix X of platform A as described with respect to FIG. 6. For example, the first platform can be an item rating and recommendation platform. The private data of the first party can include rating data R that include respective ratings of multiple items with respect to multiple users as described with respect to FIGS. 1-4. In some embodiments, the first platform includes a social network platform. The first matrix including private data of the first party can be the matrix Y of platform B as described with respect to FIG. 6. For example, the private data of the first party can include social network data S that indicate social relationships between any two of the multiple users described with respect to FIGS. 1-4. From 702, method 700 proceeds to 704.

In some embodiments, the first platform includes an item rating and recommendation platform, the private data of the first party include rating data that include respective ratings of multiple items with respect to multiple users; the second platform includes a social network platform; and the private data of the first party include social network data that indicate social relationships between any two of the multiple users.

At 702, the first party determines whether the first matrix includes an even number of columns.

At 703, in response to determine that the first matrix includes an odd number of columns, the first party appends an all-zero column to the first matrix.

At 704, in response to determine that the first matrix includes an even number of columns, the first party generates a first random matrix having the same size as the first matrix. As one example, the first random matrix can be the matrix X' having the same dimension as the first matrix X of platform A as described with respect to FIG. 6. As another example, the first random matrix can be, for example, the matrix Y' having the same dimension as the first matrix Y of platform B as described with respect to FIG. 6.

At 706, the first party identifies a first sub-matrix of the first random matrix and a second sub-matrix of the first random matrix. In some embodiments, the first sub-matrix of the first random matrix includes a subset of columns of the first random matrix, while the second sub-matrix of the first random matrix includes the remaining columns of the first random matrix. In some embodiments, the first sub-matrix of the first random matrix includes even columns of the first random matrix (e.g., the second column, fourth column, sixth column, . . . of the first random matrix, such as $X'_e$ as described with respect to FIG. 6), and the second sub-matrix of the first random matrix includes odd columns of the first random matrix (e.g., the first column, third column, fifth column, . . . of the first random matrix, such as $X'_o$ described with respect to FIG. 6). In some embodiments, the first random matrix can be divided into a first sub-matrix of the first random matrix and a second sub-matrix of the first random matrix in another manner. For example, the first sub-matrix of the first random matrix can include the first half of the columns of the first random matrix and the second sub-matrix of the first random matrix can include the second half of the columns of the first random matrix. In some embodiments, the first random matrix can be divided into a first sub-matrix of the first random matrix and a second sub-matrix of the first random matrix such that the sub-matrices can be used to scramble the first random matrix and generate first scrambled private data of the first party for computing the matrix product of the first matrix including private data of the first party and a second matrix including the private data of the second party without exposing the private data of the first party to the second party.

At 708, the first party computes first scrambled private data of the first party based on the first matrix, the first random matrix, the first sub-matrix of the first random matrix, and the second sub-matrix of the first random matrix. The private data of the first party are not derivable solely from the first scrambled private data of the first party, for example, because of the manipulation based on the first random matrix, the first sub-matrix of the first random matrix, and the second sub-matrix of the first random matrix. As such, the first scrambled private data of the first party protects the private data of the first party from being decoded from the first scrambled private data of the first party.

In some embodiments, the first scrambled private data of the first party include a first sum of the first matrix and the first random matrix and a second sum of the first sub-matrix of the first random matrix and the second sub-matrix of the first random matrix, (e.g., $X_1=X+X'$ and $X_2=X'_e+X'_o$ as described with respect to FIG. 6). In some embodiments, the first scrambled private data of the first party can be in another form computed based on the first sub-matrix of the first random matrix, and the second sub-matrix of the first random matrix, as long as the matrix product of the first matrix including private data of the first party and the second matrix including the private data of the second party can be computed based on the first scrambled private data of the first party without exposing the private data of the first party to the second party.

At 710, the first party transmits the first scrambled private data of the first party to the second party. Because the private data of the first party are not derivable solely from the first scrambled private data of the first party, data privacy and security of the first party can be protected even though the first scrambled private data of the first party is transmitted to the second party.

At 712, the first party receives from the second party second scrambled private data of the second party. Private data of the second party are not derivable solely from the second scrambled private data of the second party. In some embodiments, the first scrambled private data of the first party and second scrambled private data of the second party can be used by either the first party or the second party to compute respective addends (e.g., M and N) of the matrix product of the first matrix including private data of the first party and a second matrix including the private data of the second party (e.g., the matrix product XY=M+N).

In some embodiments, the second scrambled private data of the second party are computed based on the second matrix, a second random matrix having the same size as the second matrix, a first sub-matrix of the second random matrix, and a second sub-matrix of the second random matrix. In some embodiments, the second scrambled private data of the second party includes a first difference between the second matrix and the second random matrix and a second difference of the first sub-matrix of the second random matrix and the second sub-matrix of the second random matrix.

In some embodiments, because of the manipulation based on the second random matrix, the first sub-matrix of the second random matrix, and the second sub-matrix of the second random matrix, the second scrambled private data of the second party protects the private data of the second party from being decoded from the second scrambled private data of the second party. Data privacy and security of the second party can be protected even though the second scrambled private data of the second party is received by the first party.

In some embodiments, the first sub-matrix of the second random matrix includes even rows of the second random matrix (e.g., the second row, fourth row, sixth row, . . . of the second random matrix, such as $Y'_e$ as described with respect to FIG. 6), and the second sub-matrix of the second random matrix includes odd rows of the second random matrix (e.g., the first row, third row, fifth row, . . . of the second random matrix, such as $Y'_o$ described with respect to FIG. 6). In some embodiments, the second random matrix can be divided into a first sub-matrix of the second random matrix and a second sub-matrix of the second random matrix in another manner, for example, depending on the first sub-matrix of the first random matrix and the second sub-matrix of the first random matrix such that the sub-matrices can be used to scramble the second random matrix and generate second scrambled private data of the second party for computing the matrix product of the first matrix including private data of the first party and a second matrix including the private data of the second party without exposing the private data of the second party to the first party.

At 714, the first party computes a first addend (e.g., M as described with respect to FIG. 6) of a matrix product of the first matrix including private data of the first party and a second matrix including the private data of the second party.

At 716, the first party receives from the second party a second addend (e.g., N as described with respect to FIG. 6) of the matrix product of the first matrix including private data of the first party and the second matrix including private data of the second party.

At 718, the first party computes the matrix product of the first matrix including private data of the first party and the second matrix including private data of the second party by summing the first addend and the second addend (e.g., the matrix product XY=M+N as described with respect to FIG. 6), without the access or knowledge of the private data of the second party.

Figure 8:
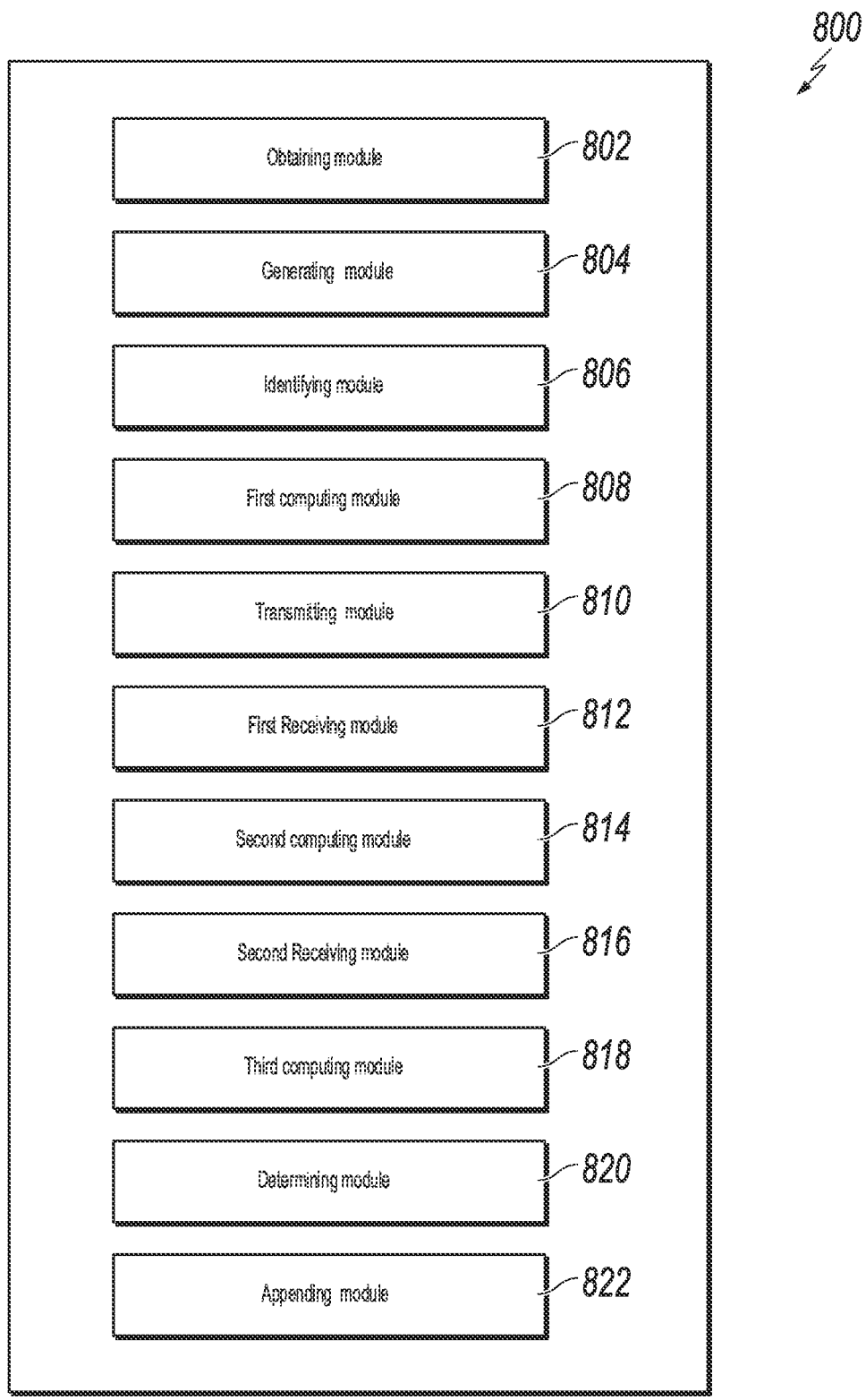
FIG. 8 depicts examples of modules of an apparatus in accordance with embodiments of this specification.

FIG. 8 is a diagram of on example of modules of an apparatus 800 in accordance with embodiments of this specification.

The apparatus 800 can be an example of an embodiment of a party participating in secure collaborative computation of a matrix product. For example, the apparatus 800 can be an example of a first party for secure collaborative computation of a matrix product of a first matrix including private data of a first party and a second matrix including private data of the second party by secret sharing without a trusted initializer The apparatus 800 can correspond to the embodiments described above, and the apparatus 800 includes the following: an obtaining module 802 for obtaining, by the first party, a first matrix including private data of the first party; a generating module 804 for generating, by the first party, a first random matrix having the same size as the first matrix; an identifying module 806 for identifying, by the first party, a first sub-matrix of the first random matrix and a second sub-matrix of the first random matrix; a first computing module 808 for computing, by the first party, first scrambled private data of the first party based on the first matrix, the first random matrix, the first sub-matrix of the first random matrix, and the second sub-matrix of the first random matrix, wherein the private data of the first party are not derivable solely from the first scrambled private data of the first party; a first receiving module 812 for receiving, by the first party from the second party, second scrambled private data of the second party, wherein the private data of the second party are not derivable solely from the second scrambled private data of the second party; a second computing module 814 for computing, by the first party, a first addend of the matrix product of the first matrix including the private data of the first party and the second matrix including the private data of the second party; a second receiving module 816 for receiving, by the first party from the second party, a second addend of the matrix product of the first matrix including the private data of the first party and the second matrix including the private data of the second party; and a third computing module 818 for computing, by the first party, the matrix product of the first matrix including the private data of the first party and the second matrix including the private data of the second party by summing the first addend and the second addend.

In an optional embodiment, the apparatus 800 further includes the following: a transmitting module 810 for transmitting, by the first party to the second party, the first scrambled private data of the first party to the second party.

In an optional embodiment, the apparatus 800 further includes the following: a determining module 820 for determining whether the first matrix includes an even number of columns; and an appending module 822 for appending an all-zero column to the first matrix in response to determine that the first matrix includes an odd number of columns.

In an optional embodiment, the first sub-matrix of the first random matrix includes all even columns of the first random matrix, and the second sub-matrix of the first random matrix includes all odd columns of the first random matrix.

In an optional embodiment, the first scrambled private data of the first party includes a first sum of the first matrix and the first random matrix and a second sum of the first sub-matrix of the first random matrix and the second sub-matrix of the first random matrix.

In an optional embodiment, the second scrambled private data of the second party is computed based on the second matrix, a second random matrix having the same size as the second matrix, a first sub-matrix of the second random matrix, and a second sub-matrix of the second random matrix.

In an optional embodiment, the first sub-matrix of the second random matrix includes all even rows of the second random matrix, and the second sub-matrix of the second random matrix includes all odd rows of the second random matrix.

In an optional embodiment, the second scrambled private data of the second party includes a first difference between the second matrix and the second random matrix and a second difference of the first sub-matrix of the second random matrix and the second sub-matrix of the second random matrix.

In an optional embodiment, the first platform includes an item rating and recommendation platform; the private data of the first party include rating data that include respective ratings of multiple items with respect to multiple users; the second platform includes a social network platform; and the private data of the first party include social network data that indicate social relationships between any two of the multiple users.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIG. 8, it can be interpreted as illustrating an internal functional module and a structure of a computing apparatus of a first party for secure collaborative computation of a matrix product of a first matrix including private data of a first party and a second matrix including private data of the second party by secret sharing without a trusted initializer. An execution body in essence can be an electronic device, and the electronic device includes the following: one or more processors; and a memory configured to store an executable instruction of the one or more processors.

The one or more processors are configured to obtain, by the first party, a first matrix including private data of the first party; generate, by the first party, a first random matrix having the same size as the first matrix; identify, by the first party, a first sub-matrix of the first random matrix and a second sub-matrix of the first random matrix; compute, by the first party, first scrambled private data of the first party based on the first matrix, the first random matrix, the first sub-matrix of the first random matrix, and the second sub-matrix of the first random matrix, wherein the private data of the first party are not derivable solely from the first scrambled private data of the first party; receive, by the first party from the second party, second scrambled private data of the second party, wherein the private data of the second party are not derivable solely from the second scrambled private data of the second party; compute, by the first party, a first addend of the matrix product of the first matrix including the private data of the first party and the second matrix including the private data of the second party; receive, by the first party from the second party, a second addend of the matrix product of the first matrix including the private data of the first party and the second matrix including the private data of the second party; and compute, by the first party, the matrix product of the first matrix including the private data of the first party and the second matrix including the private data of the second party by sum the first addend and the second addend.

Optionally, the one or more processors are configured to transmit, by the first party to the second party, the first scrambled private data of the first party to the second party.

Optionally, the one or more processors are configured to determine whether the first matrix includes an even number of columns; and in response to determine that the first matrix includes an odd number of columns, append an all-zero column to the first matrix.

Optionally, the first sub-matrix of the first random matrix includes all even columns of the first random matrix, and the second sub-matrix of the first random matrix includes all odd columns of the first random matrix.

Optionally, the first scrambled private data of the first party includes a first sum of the first matrix and the first random matrix and a second sum of the first sub-matrix of the first random matrix and the second sub-matrix of the first random matrix.

Optionally, the second scrambled private data of the second party is computed based on the second matrix, a second random matrix having the same size as the second matrix, a first sub-matrix of the second random matrix, and a second sub-matrix of the second random matrix.

Optionally, the first sub-matrix of the second random matrix includes all even rows of the second random matrix, and the second sub-matrix of the second random matrix includes all odd rows of the second random matrix.

Optionally, the second scrambled private data of the second party includes a first difference between the second matrix and the second random matrix and a second difference of the first sub-matrix of the second random matrix and the second sub-matrix of the second random matrix.

Optionally, the first platform includes an item rating and recommendation platform; the private data of the first party include rating data that include respective ratings of multiple items with respect to multiple users; the second platform includes a social network platform; and the private data of the first party include social network data that indicate social relationships between any two of the multiple users.

The techniques described in this specification produce one or more technical effects. In some embodiments, the described techniques allow different parties (e.g., platforms, participants, and entities) to securely collaborate in secret sharing without disclosing private or sensitive data, which encourages integration and collaboration among the parties without compromising data privacy. In some embodiments, the described techniques allow parties that participate in secret sharing to achieve secure collaborative computation of a matrix product of private data of the parties, without one party's access or knowledge to another party's private data, For example, as a result of the designed secret sharing schemes, a party can calculate a matrix product of its own private data and private data of another party without accessing or knowing the private data of another party, and vice versa. Thus, the data privacy and security of each party can be protected. In some embodiments, the described techniques allow parties to collaborate and achieve data security without the overhead of a third-party authority such as a trusted initializer, thus reducing the cost of the third-party authority. In some embodiments, the described techniques allow each party to perform calculation locally, without the intervention of a third party, thus improving the efficiency and flexibility of collaboration. In some other embodiments, since much of the work (e.g., random number generation and location computation) can be done by various parties before applying the secret sharing scheme, the described techniques allow for more efficient common development activities (such as, with respect to time, processor cycles, memory usage, and network bandwidth/congestion) or activities not supported by current online parties. In still other embodiments, the described techniques can provide improved recommendation models of the item rating and recommendation parties and provide better-targeted recommendations (such as, a movie recommendation party providing more targeted, relevant recommendations to users by leveraging obtained social network data from a social media platform). Other advantages will be apparent to those of ordinary skill in the art.

Described embodiments of the subject matter can include one or more features, alone or in combination.

For example, in a first embodiment, a computer-implemented method for secure collaborative computation of a matrix product of a first matrix including private data of a first party and a second matrix including private data of the second party by secret sharing without a trusted initializer, the method including: obtaining, by the first party, a first matrix including private data of the first party; generating, by the first party, a first random matrix having the same size as the first matrix; identifying, by the first party, a first sub-matrix of the first random matrix and a second sub-matrix of the first random matrix; computing, by the first party, first scrambled private data of the first party based on the first matrix, the first random matrix, the first sub-matrix of the first random matrix, and the second sub-matrix of the first random matrix, wherein the private data of the first party are not derivable solely from the first scrambled private data of the first party; receiving, by the first party from the second party, second scrambled private data of the second party, wherein the private data of the second party are not derivable solely from the second scrambled private data of the second party; computing, by the first party, a first addend of the matrix product of the first matrix including the private data of the first party and the second matrix including the private data of the second party; receiving, by the first party from the second party, a second addend of the matrix product of the first matrix including the private data of the first party and the second matrix including the private data of the second party; and computing, by the first party, the matrix product of the first matrix including the private data of the first party and the second matrix including the private data of the second party by summing the first addend and the second addend.

The foregoing and other described embodiments can each, optionally, include one or more of the following features:

A first feature, combinable with any of the following features, further including: transmitting, by the first party to the second party, the first scrambled private data of the first party to the second party.

A second feature, combinable with any of the following features, further including: determining whether the first matrix includes an even number of columns; and in response to determine that the first matrix includes an odd number of columns, appending an all-zero column to the first matrix.

A third feature, combinable with any of the following features, wherein the first sub-matrix of the first random matrix includes all even columns of the first random matrix, and the second sub-matrix of the first random matrix includes all odd columns of the first random matrix.

A fourth feature, combinable with any of the following features, wherein the first scrambled private data of the first party includes a first sum of the first matrix and the first random matrix and a second sum of the first sub-matrix of the first random matrix and the second sub-matrix of the first random matrix.

A fifth feature, combinable with any of the following features, wherein the second scrambled private data of the second party is computed based on the second matrix, a second random matrix having the same size as the second matrix, a first sub-matrix of the second random matrix, and a second sub-matrix of the second random matrix.

A sixth feature, combinable with any of the following features, wherein the first sub-matrix of the second random matrix includes all even rows of the second random matrix, and the second sub-matrix of the second random matrix includes all odd rows of the second random matrix.

A seventh feature, combinable with any of the following features, wherein the second scrambled private data of the second party includes a first difference between the second matrix and the second random matrix and a second difference of the first sub-matrix of the second random matrix and the second sub-matrix of the second random matrix.

An eighth feature, combinable with any of the following features, wherein: the first platform includes an item rating and recommendation platform; the private data of the first party include rating data that include respective ratings of multiple items with respect to multiple users; the second platform includes a social network platform; and the private data of the first party include social network data that indicate social relationships between any two of the multiple users.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data.

The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for performing a secure collaborative computation, the method comprising:
   obtaining, by one or more processors of a first party, a first matrix comprising first private data recorded by the first party, wherein the first party comprises a recommendation platform that provides a plurality of services to a plurality of users and the first private data comprises first social relationships between any two of the plurality of users of the recommendation platform, wherein the recommendation platform comprises first user data and item data, and wherein a first portion of the first private data comprises the first user data and a second portion of the first private data comprises the item data, the first user data comprising first user names, first user ages, first user genders, first user addresses, purchase histories, first browsing histories, or search histories and the item data comprising item names, categories, prices, keywords, or instructions;
   generating, by the one or more processors of the first party, a first random matrix having a size identical to as the first matrix, wherein the first random matrix ensures security of the first private data included in the first matrix;
   identifying, by the one or more processors of the first party, a first sub-matrix of the first random matrix and a second sub- matrix of the first random matrix, wherein the first sub-matrix of the first random matrix comprises all even columns of the first random matrix, and the second sub-matrix of the first random matrix comprises all odd columns of the first random matrix;

computing, by the one or more processors of the first party, first scrambled private data of the first party based on the first matrix, the first random matrix, the first sub-matrix of the first random matrix, and the second sub-matrix of the first random matrix, wherein the first private data of the first party are not derivable solely from the first scrambled private data of the first party thereby preventing exposure of the first private data to a second party, wherein the first scrambled private data of the first party comprises a first sum of the first matrix and the first random matrix and a second sum of the first sub-matrix of the first random matrix and the second sub-matrix of the first random matrix;

transmitting, by the one or more processors of the first party directly to the second party without a trusted initializer, the first scrambled private data of the first party, wherein the second party comprises a social network platform that accumulates second private data from the plurality of users, wherein the social network platform comprises second user data comprising second user names, second user ages, second user genders, second user addresses, second browsing histories, employment information, or recreational information, at least a portion of the second user data corresponding to at least a portion of the first user data;

receiving, by the one or more processors of the first party from the second party, second scrambled private data of the second party, wherein the second private data of the second party are not derivable solely from the second scrambled private data of the second party, thereby preventing exposure of the second private data to the first party, wherein the second private data comprises second social relationships between any two of the plurality of users;

computing, by the one or more processors of the first party, a first addend of a matrix product of the first matrix comprising the first private data of the first party and a second matrix comprising second private data of the second party;

receiving, by the one or more processors of the first party from the second party, a second addend of the matrix product of the first matrix comprising the first private data of the first party and the second matrix comprising the second private data of the second party;

performing, by the one or more processors of the first party, a local computation of the matrix product of the first matrix comprising the first private data of the first party and the second matrix comprising the second private data of the second party by solving an optimization problem using gradient descents of the first addend and the second addend, wherein the local computation generates updated user data and updated feature data, and wherein the local computation reduces network and processing resources and conserves the security of the first private data included in the first matrix; and generating, by the one or more processors of the first party, a recommendation for a particular service of the plurality of services for one of the plurality of users of the recommendation platform, the recommendation being based on the updated user data and the updated feature data.

2. The method of claim 1, further comprising:
transmitting, by the first party, the first scrambled private data of the first party to the second party.

3. The method of claim 1, further comprising:
determining whether the first matrix comprises an even number of columns; and
in response to determining that the first matrix comprises an odd number of columns, appending an all-zero column to the first matrix.

4. The method of claim 1, wherein the second scrambled private data of the second party is computed based on the second matrix, a second random matrix having the a second size identical to as the second matrix, the first sub-matrix of the second random matrix, and the second sub-matrix of the second random matrix.

5. The method of claim 4, wherein the first sub- matrix of the second random matrix comprises all even rows of the second random matrix, and the second sub-matrix of the second random matrix comprises all odd rows of the second random matrix.

6. The method of claim 4, wherein the second scrambled private data of the second party comprises a first difference between the second matrix and the second random matrix and a second difference of the first sub-matrix of the second random matrix and the second sub-matrix of the second random matrix.

7. The method of claim 1, wherein:
the first private data of the first party comprise rating data that comprise respective ratings of a plurality of items with respect to the plurality of users.

8. A non-transitory, computer-readable storage medium storing one or more instructions executable by a computer system to perform operations for performing a secure collaborative computation, the operations comprising:

obtaining, by a first party, a first matrix comprising first private data recorded by the first party, wherein the first party comprises a recommendation platform that provides a plurality of services to a plurality of users and the first private data comprises first social relationships between any two of the plurality of users of the recommendation platform, wherein the recommendation platform comprises first user data and item data, and wherein a first portion of the first private data comprises the first user data and a second portion of the first private data comprises the item data, the first user data comprising first user names, first user ages, first user genders, first user addresses, purchase histories, first browsing histories, or search histories and the item data comprising item names, categories, prices, keywords, or instructions;

generating, by the first party, a first random matrix having a size identical to the first matrix, wherein the first random matrix ensures security of the first private data included in the first matrix;

identifying, by the first party, a first sub-matrix of the first random matrix and a second sub-matrix of the first random matrix, wherein the first sub-matrix of the first random matrix comprises all even columns of the first random matrix, and the second sub-matrix of the first random matrix comprises all odd columns of the first random matrix;

computing, by the first party, first scrambled private data of the first party based on the first matrix, the first random matrix, the first sub-matrix of the first random matrix, and the second sub-matrix of the first random matrix, wherein the first private data of the first party are not derivable solely from the first scrambled private data of the first party thereby preventing exposure of the first private data to a second party, wherein the first scrambled private data of the first party comprises a first sum of the first matrix and the first random matrix and a second sum of the first sub-matrix of the first random matrix and the second sub-matrix of the first random matrix;

transmitting, by the first party directly to the second party without a trusted initializer, the first scrambled private data of the first party, wherein the second party comprises a social network platform that accumulates second private data from the plurality of users, wherein the social network platform comprises second user data comprising second user names, second user ages, second user genders, second user addresses, second browsing histories, employment information, or recreational information, at least a portion of the second user data corresponding to at least a portion of the first user data;

receiving, by the first party from the second party, second scrambled private data of the second party, wherein second private data of the second party are not derivable solely from the second scrambled private data of the second party, thereby preventing exposure of the second private data to the first party, wherein the second private data comprises second social relationships between any two of the plurality of users;

computing, by the first party, a first addend of a matrix product of the first matrix comprising the first private data of the first party and a second matrix comprising second private data of the second party;

receiving, by the first party from the second party, a second addend of the matrix product of the first matrix comprising the first private data of the first party and the second matrix comprising the second private data of the second party;

performing, by the first party, a local computation of the matrix product of the first matrix comprising the first private data of the first party and the second matrix comprising the second private data of the second party by solving an optimization problem using gradient descents of the first addend and the second addend, wherein the local computation generates updated user data and updated feature data, and wherein the local computation reduces network and processing resources and conserves the security of the first private data included in the first matrix; and generating, by the first party, a recommendation for a particular service of the plurality of services for one of the plurality of users of the recommendation platform, the recommendation being based on the updated user data and the updated feature data.

9. The non-transitory, computer-readable storage medium of claim 8, the operations further comprising:
transmitting, by the first party, the first scrambled private data of the first party to the second party.

10. The non-transitory, computer-readable storage medium of claim 8, the operations further comprising:
determining whether the first matrix comprises an even number of columns; and
in response to determining that the first matrix comprises an odd number of columns, appending an all-zero column to the first matrix.

11. The non-transitory, computer-readable storage medium of claim 8, wherein the second scrambled private data of the second party is computed based on the second matrix, a second random matrix having a second size identical to the second matrix, the first sub-matrix of the second random matrix, and the second sub-matrix of the second random matrix.

12. The non-transitory, computer-readable storage medium of claim 11, wherein the first sub-matrix of the second random matrix comprises all even rows of the second random matrix, and the second sub-matrix of the second random matrix comprises all odd rows of the second random matrix.

13. The non-transitory, computer-readable storage medium of claim 11, wherein the second scrambled private data of the second party comprises a first difference between the second matrix and the second random matrix and a second difference of the first sub-matrix of the second random matrix and the second sub- matrix of the second random matrix.

14. The non-transitory, computer-readable storage medium of claim 8, wherein:
the first private data of the first party comprise rating data that comprise respective ratings of a plurality of items with respect to a plurality of users.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform operations for performing a secure collaborative computation, the operations comprising:
obtaining, by a first party, a first matrix comprising first private data recorded by the first party, wherein the first party comprises a recommendation platform that provides a plurality of services to a plurality of users and the first private data comprises first social relationships between any two of the plurality of users of the recommendation platform, wherein the recommendation platform comprises first user data and item data, and wherein a first portion of the first private data comprises the first user data and a second portion of the first private data comprises the item data, the first user data comprising first user names, first user ages, first user genders, first user addresses, purchase histories, first browsing histories, or search histories and the item data comprising item names, categories, prices, keywords, or instructions;
generating, by the first party, a first random matrix having a size identical to the first matrix, wherein the first random matrix ensures security of the first private data included in the first matrix;
identifying, by the first party, a first sub-matrix of the first random matrix and a second sub-matrix of the first random matrix, wherein the first sub-matrix of the first random matrix comprises all even columns of the first random matrix, and the second sub-matrix of the first random matrix comprises all odd columns of the first random matrix;
computing, by the first party, first scrambled private data of the first party based on the first matrix, the first random matrix, the first sub-matrix of the first random matrix, and the second sub-matrix of the first random matrix, wherein the first private data of the first party are not derivable solely from the first scrambled private data of the first party thereby preventing exposure of the first private data to a second party, wherein the first scrambled private data of the first party comprises a first sum of the first matrix and the first random matrix and a second sum of the first sub-matrix of the first random matrix and the second sub-matrix of the first random matrix;

transmitting, by the first party directly to the second party without a trusted initializer, the first scrambled private data of the first party, wherein the second party comprises a social network platform that accumulates second private data from the plurality of users, wherein the social network platform comprises second user data comprising second user names, second user ages, second user genders, second user addresses, second browsing histories, employment information, or recreational information, at least a portion of the second user data corresponding to at least a portion of the first user data;

receiving, by the first party from the second party, second scrambled private data of the second party, wherein second private data of the second party are not derivable solely from the second scrambled private data of the second party, thereby preventing exposure of the second private data to the first party, wherein the second private data comprises second social relationships between any two of the plurality of users;

computing, by the first party, a first addend of a matrix product of the first matrix comprising the first private data of the first party and a second matrix comprising second private data of the second party;

receiving, by the first party from the second party, a second addend of the matrix product of the first matrix comprising the first private data of the first party and the second matrix comprising the second private data of the second party;

performing, by the first party, a local computation of the matrix product of the first matrix comprising the first private data of the first party and the second matrix comprising the second private data of the second party by solving an optimization problem using gradient descents of the first addend and the second addend, wherein the local computation generates updated user data and updated feature data, and wherein the local computation reduces network and processing resources and conserves the security of the first private data included in the first matrix; and generating, by the first party, a recommendation for a particular service of the plurality of services for one of the plurality of users of the recommendation platform, the recommendation being based on the updated user data and the updated feature data.

16. The computer-implemented system of claim 15, the operations further comprising:
transmitting, by the first party, the first scrambled private data of the first party to the second party.

17. The computer-implemented system of claim 15, the operations further comprising:
determining whether the first matrix comprises an even number of columns; and
in response to determining that the first matrix comprises an odd number of columns, appending an all-zero column to the first matrix.

18. The computer-implemented system of claim 15, wherein the second scrambled private data of the second party is computed based on the second matrix, a second random matrix having a second size identical to the second matrix, the first sub-matrix of the second random matrix, and the second sub-matrix of the second random matrix.

19. The computer-implemented system of claim 18, wherein the first sub-matrix of the second random matrix comprises all even rows of the second random matrix, and the second sub-matrix of the second random matrix comprises all odd rows of the second random matrix.

20. The computer-implemented system of claim 18, wherein the second scrambled private data of the second party comprises a first difference between the second matrix and the second random matrix and a second difference of the first sub-matrix of the second random matrix and the second sub-matrix of the second random matrix.

21. The computer-implemented system of claim 15, wherein:
the first private data of the first party comprise rating data that comprise respective ratings of a plurality of items with respect to a plurality of users.

* * * * *

UNITED STATES PATENT AND TRADEMARK OFFICE
CERTIFICATE OF CORRECTION

PATENT NO. : 11,386,212 B2
APPLICATION NO. : 16/668945
DATED : July 12, 2022
INVENTOR(S) : Li et al.

It is certified that error appears in the above-identified patent and that said Letters Patent is hereby corrected as shown below:

In the Claims

Column 24, Line 66, in Claim 1, delete "sub- matrix" and insert -- sub-matrix --.

Column 26, Line 12, in Claim 4, delete "the a" and insert -- a --.

Column 26, Line 16, in Claim 5, delete "sub- matrix" and insert -- sub-matrix --.

Column 28, Line 15, in Claim 13, delete "sub- matrix" and insert -- sub-matrix --.

Signed and Sealed this
Fourth Day of October, 2022

Katherine Kelly Vidal
*Director of the United States Patent and Trademark Office*